United States Patent
Salvaggio, Jr.

(10) Patent No.: US 10,150,527 B2
(45) Date of Patent: Dec. 11, 2018

(54) INTEGRATED ELECTRONIC COMPONENT IN VEHICLE BODY

(71) Applicant: David Salvaggio, Jr., Grafton, WI (US)

(72) Inventor: David Salvaggio, Jr., Grafton, WI (US)

(73) Assignee: David Salvaggio, Jr.

( * ) Notice: Subject to any disclaimer, the term of this patent is extended or adjusted under 35 U.S.C. 154(b) by 25 days.

(21) Appl. No.: 15/656,980

(22) Filed: Jul. 21, 2017

(65) Prior Publication Data

US 2017/0320532 A1    Nov. 9, 2017

Related U.S. Application Data

(63) Continuation-in-part of application No. 14/841,041, filed on Aug. 31, 2015, now Pat. No. 9,950,761, (Continued)

(51) Int. Cl.
*B62J 23/00*    (2006.01)
*B62J 35/00*    (2006.01)
(Continued)

(52) U.S. Cl.
CPC ................. *B62J 23/00* (2013.01); *B62J 6/00* (2013.01); *B62J 35/00* (2013.01); *F21K 9/64* (2016.08);
(Continued)

(58) Field of Classification Search
None
See application file for complete search history.

(56) References Cited

U.S. PATENT DOCUMENTS 4,068,859 A    1/1978 Dittman
5,511,822 A    4/1996 Wolanski
(Continued)

FOREIGN PATENT DOCUMENTS

DE    20021745 U1    3/2001
EP    2 165 921 A2    3/2010
(Continued)

OTHER PUBLICATIONS

EasyComposites Ltd, Beginners' Guide to Out-of-Autoclave Prepreg Carbon Fibre, pp. 1-21, Retrieved from the Internet on Sep. 26, 2016: <http://www.easycomposites.co.uk/downloads/TDS/EC-TDS-Beginners-Guide-to-Prepreg-Carbon-Fibre.pdf>.
(Continued)

*Primary Examiner* — Karabi Guharay
*Assistant Examiner* — Zachary J Snyder
(74) *Attorney, Agent, or Firm* — Marshall, Gerstein & Borun LLP

(57) ABSTRACT

An electronic component is integrated into a vehicle body component, such as an automobile, a bicycle, etc., and may be an electronic lighting material and/or an electronic sensor. The vehicle body component is formed of multiple layers of a composite material that may be assembled to take the shape of a mold of a particular vehicle component. A sensor or lighting device is disposed in a void formed in the one or more of the layers of the composite material, and this device may be enclosed in the void by other layers. The lighting material and/or sensing mechanism are configured to connect to a power source via electrical wiring that is disposed either between or through the composite layers that form the vehicle body component and the vehicle body component is then cured to form a hardened vehicle body part with the sensor or lighting device formed therein.

18 Claims, 19 Drawing Sheets

Related U.S. Application Data which is a continuation of application No. 13/851,701, filed on Mar. 27, 2013, now Pat. No. 9,120,517.

(60) Provisional application No. 61/616,992, filed on Mar. 28, 2012, provisional application No. 62/415,423, filed on Oct. 31, 2016.

(51) Int. Cl.
*B62J 6/00* (2006.01)
*F21V 23/00* (2015.01)
*F21K 9/64* (2016.01)
*F21Y 115/10* (2016.01)

(52) U.S. Cl.
CPC ......... *F21V 23/002* (2013.01); *F21Y 2115/10* (2016.08); *Y10T 29/49826* (2015.01)

(56) References Cited

U.S. PATENT DOCUMENTS

| | | | |
|---|---|---|---|
| D385,232 S | 10/1997 | Thurm | |
| 5,795,420 A | 8/1998 | English | |
| 5,884,380 A | 3/1999 | Thurm | |
| 6,062,601 A | 5/2000 | Willie et al. | |
| 6,152,585 A | 11/2000 | Barry | |
| 6,327,954 B1 | 12/2001 | Medlin | |
| 6,341,792 B1 | 1/2002 | Okuma | |
| 6,663,128 B2 | 12/2003 | Dichter | |
| 6,733,038 B1 | 5/2004 | Prather | |
| RE39,417 E | 12/2006 | Barry | |
| 7,266,434 B2 | 9/2007 | McCullough et al. | |
| 7,475,749 B2 | 1/2009 | Yoshida et al. | |
| 7,641,371 B2 | 1/2010 | Effner et al. | |
| 7,857,928 B1 | 12/2010 | Mackey | |
| 8,752,989 B2 | 6/2014 | Roberts et al. | |
| 9,120,517 B2 | 9/2015 | Salvaggio | |
| 9,188,293 B1 | 11/2015 | Corporon et al. | |
| 9,329,318 B2 | 5/2016 | Russert | |
| 2002/0128933 A1 | 9/2002 | Day et al. | |
| 2005/0088850 A1 | 4/2005 | Miller | |
| 2005/0126546 A1 | 6/2005 | Yagisawa | |
| 2005/0132997 A1 | 6/2005 | Vargas | |
| 2006/0139939 A1 | 6/2006 | Ohira et al. | |
| 2011/0120795 A1 | 5/2011 | Roby et al. | |
| 2011/0137758 A1 | 6/2011 | Bienias | |
| 2011/0169251 A1 | 7/2011 | Arndt et al. | |
| 2012/0094106 A1* | 4/2012 | Honma | B32B 5/10 428/299.1 |
| 2012/0280528 A1* | 11/2012 | Dellock | B60R 1/06 296/1.08 |
| 2012/0320615 A1 | 12/2012 | Englert | |
| 2014/0003072 A1 | 1/2014 | Yamamoto et al. | |
| 2014/0240999 A1 | 8/2014 | Roberts et al. | |
| 2015/0046027 A1 | 2/2015 | Sura et al. | |
| 2015/0174642 A1 | 6/2015 | Krammer et al. | |
| 2015/0291085 A1 | 10/2015 | Manning | |
| 2015/0307033 A1 | 10/2015 | Preisler et al. | |
| 2016/0258591 A1 | 9/2016 | Salter et al. | |

FOREIGN PATENT DOCUMENTS

| | | |
|---|---|---|
| JP | 10-181658 | 7/1998 |
| JP | 2000-177408 A | 6/2000 |
| WO | WO-2013/148848 A1 | 10/2013 |

OTHER PUBLICATIONS

Immortal Graphix, "Custom Tank Pads", (2013). Retrieved from the Internet on Jun. 26, 2013: <http://www.immortalgraphix.com/customtankpads.aspx>.

Immortal Graphix, "Customize Your Own", (2013). Retrieved from the Internet on Jun. 26, 2013: <http://www.immortalgraphix.com/customizeyourown.aspx>.

Mad Mac's Custom Graphic Designs, Inc., "Mad Mac's Custom Cover Ups". Retrieved from the Internet on Jun. 26, 2013: <http://www.madmacscustom.com/COVERUP.html>.

Mag-Knight™ Inc., "Mag-Knight Products Page", (2010) Retrieved from the Internet on Jun. 26, 2013: <http://www.mag-knight.com/products.htm>.

Hell's Foundry, Inc., "Exclusive Accessories for your Harley Davidson Bagger",(2005-2013). Retrieved from the Internet on Jun. 26, 2013: <http://www.hellsfoundry.com/dashlink.htm>.

Immortal Graphix, "Designing Your Own Tank Pac," (2013). Retrieved from the Internet on Jun. 26, 2013: <http://www.immortalgraphix.com/designingyourowntankpad.aspx>.

Cobra International, Inc., "Street Glo Hotwraps," (2013). Retrieved from the Internet on Jun. 26, 2013: <http://www.streetglo.net/hotwraps.motorcycle.html>.

Vicious Cycle, "Cycle Bagger Parts," (2013). Retrieved from the Internet on Jun. 26, 2013: <http://vicious-cycles.com/baggerparts.html>.

Harley-Davidson, Inc., "H-D1 Customization," (2001-2013). Retrieved from the Internet on Jun. 26, 2013: <http://www.harley-davidson.com/en_US/Content/Pages/H-D1_Customization/bike-builder.html>.

International Search Report and Written Opinion for Application No. PCT/US2013/034124, dated Jul. 11, 2013.

International Search Report and Written Opinion for Application No. PCT/US2017/058399, dated Feb. 22, 2018.

* cited by examiner

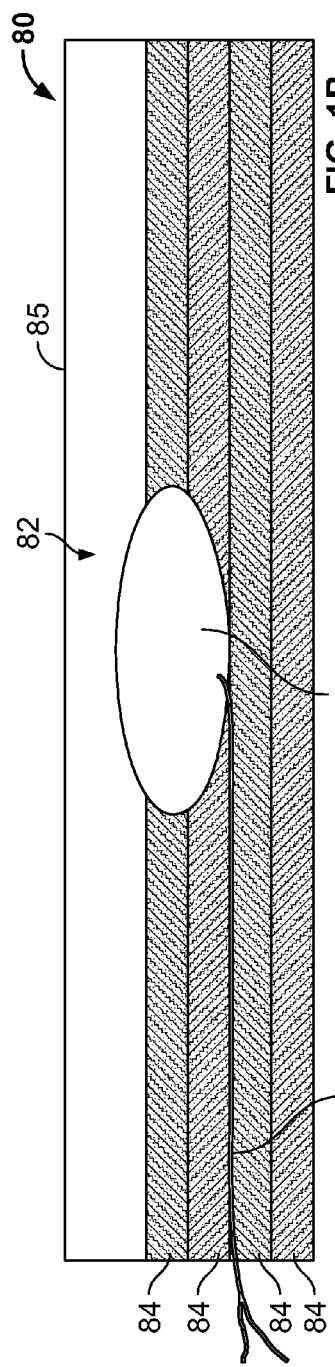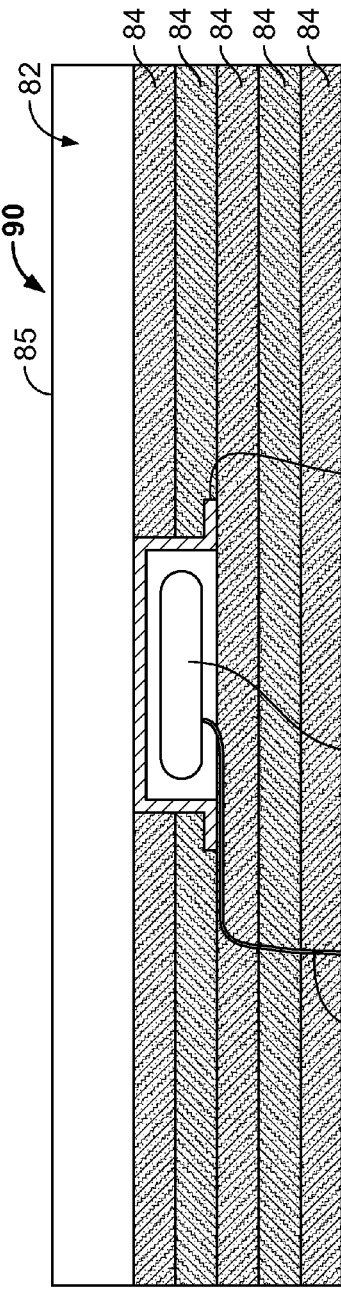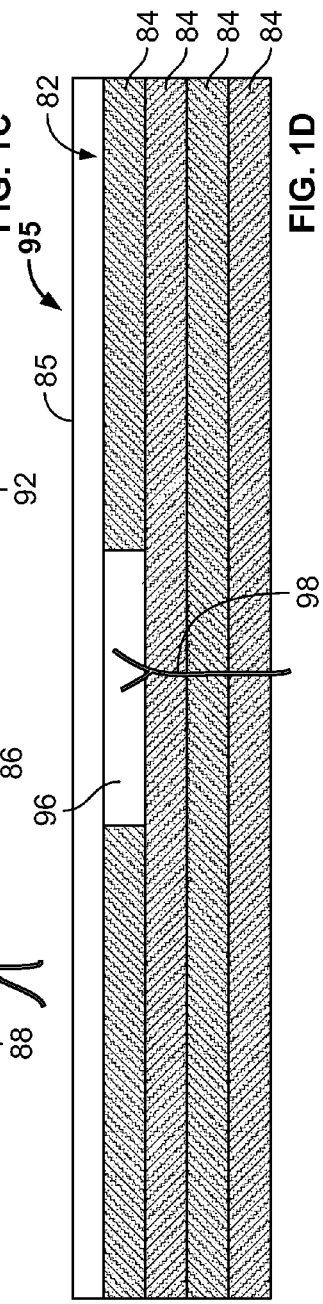

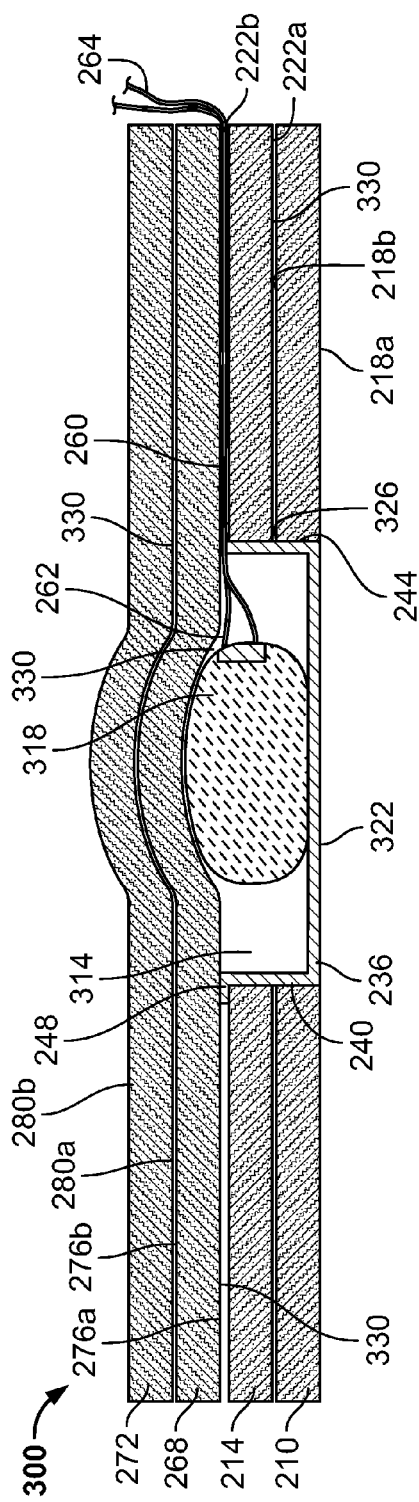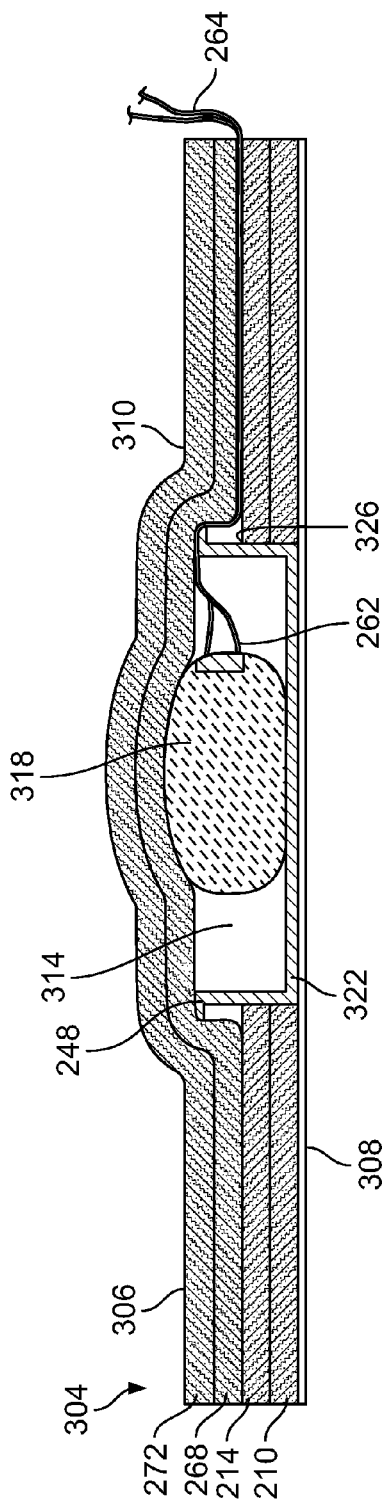
FIG. 4A
FIG. 4B

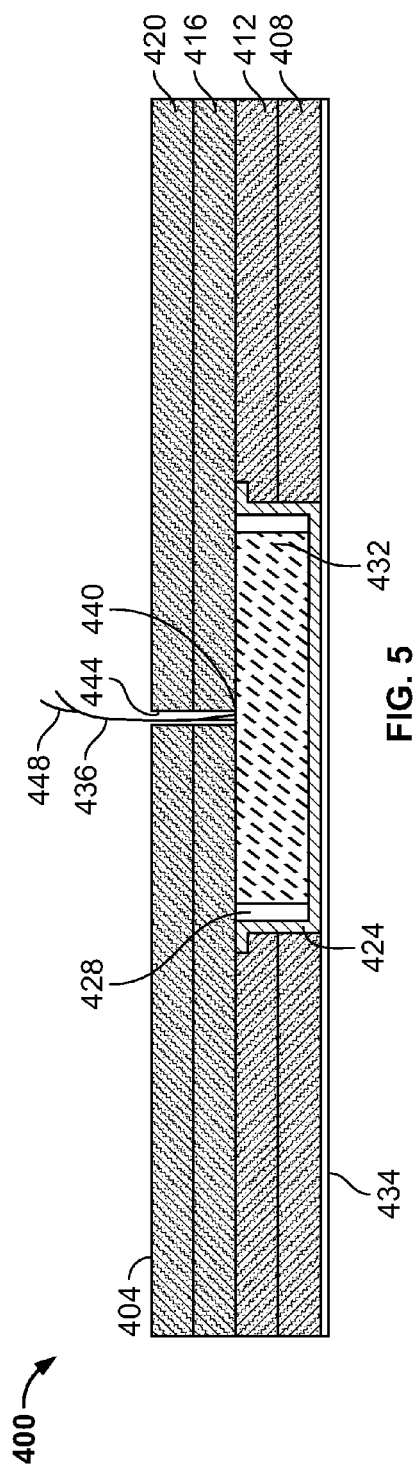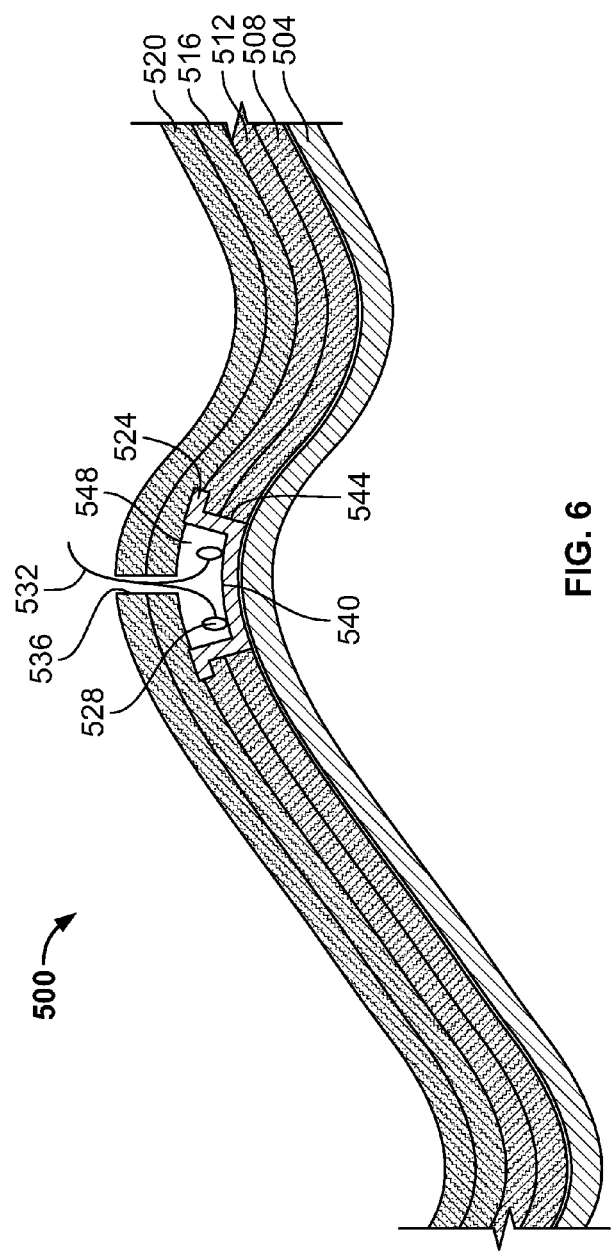

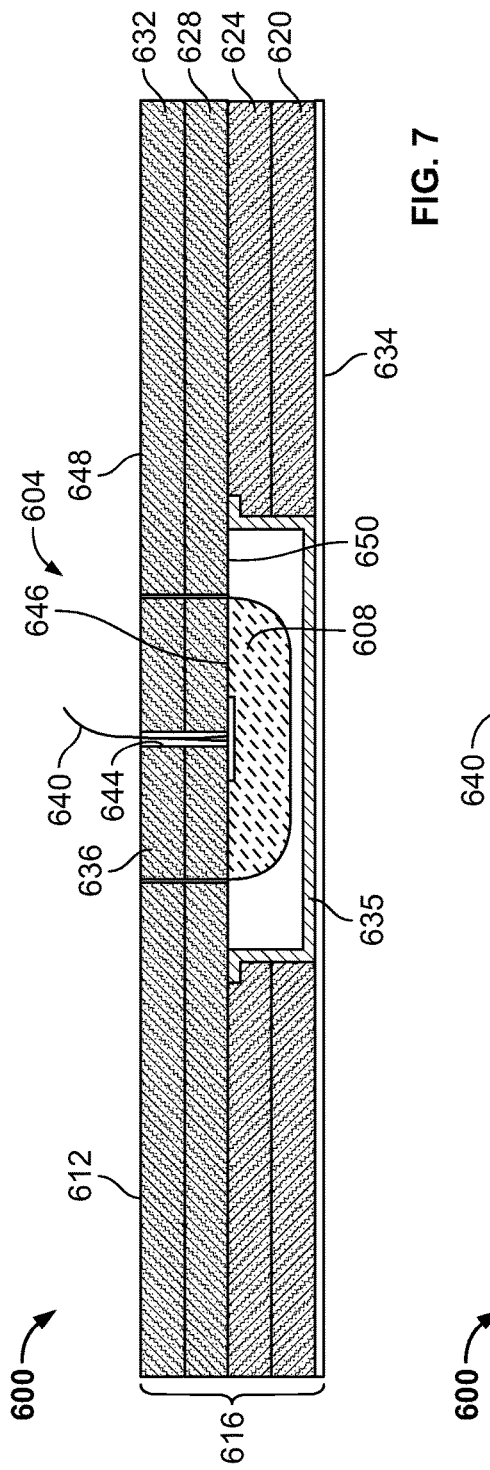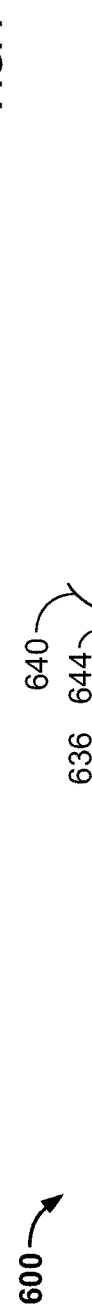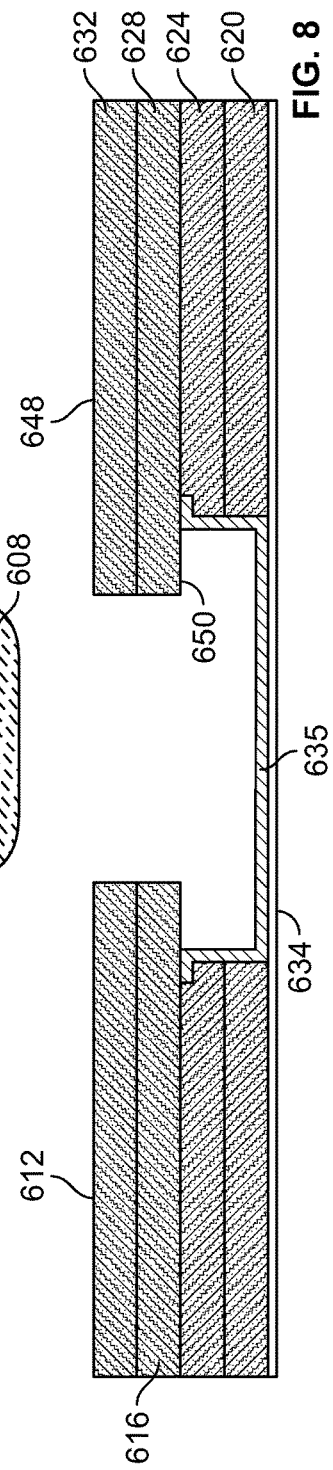

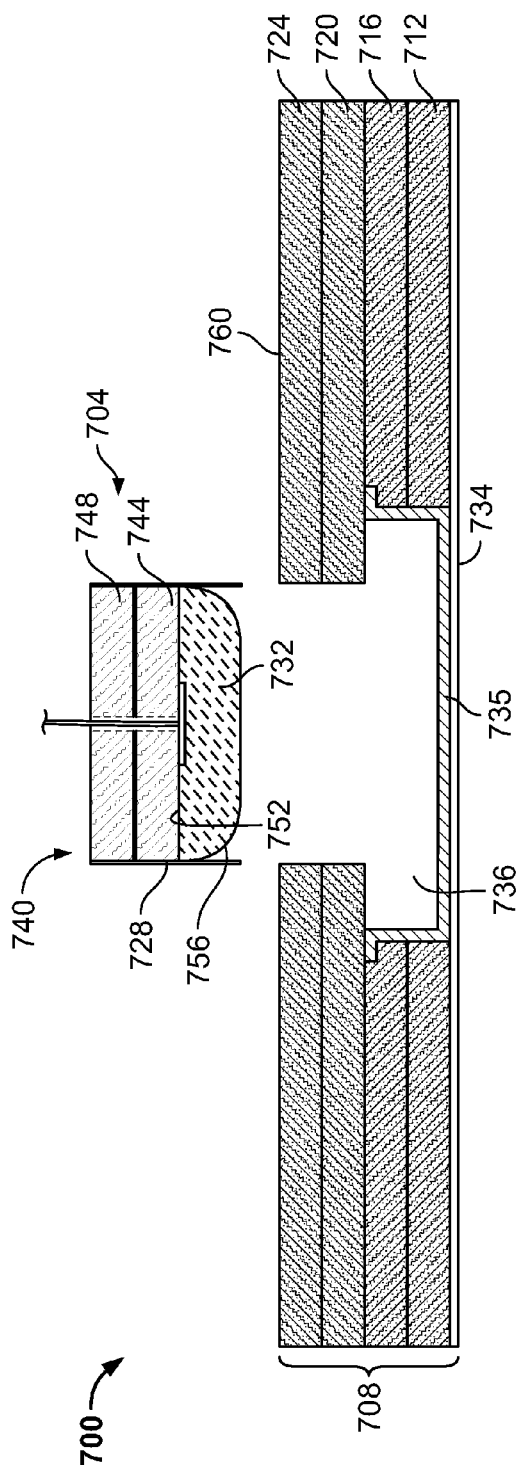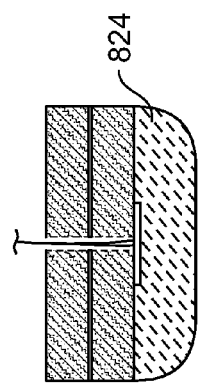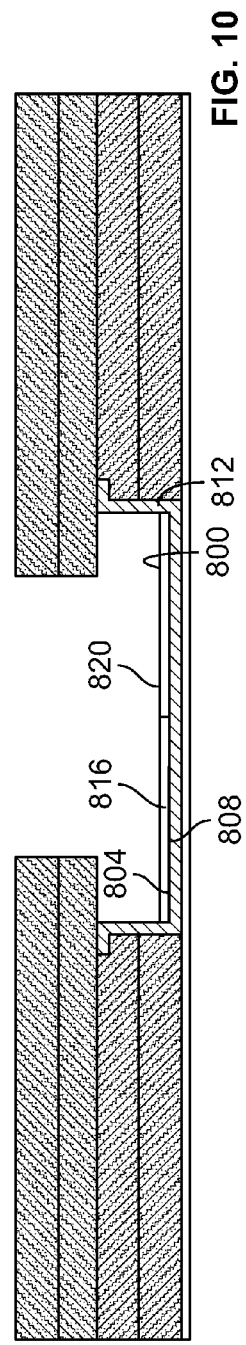

INTEGRATED ELECTRONIC COMPONENT IN VEHICLE BODY

CROSS REFERENCE TO OTHER APPLICATIONS

This application claims benefit of and priority to U.S. Provisional Patent Application Ser. No. 62/415,423, entitled "Integrated Electronic Component in Vehicle Body," filed on Oct. 31, 2016, and this application is a continuation-in-part of U.S. patent application Ser. No. 14/841,041, entitled "Carbon Fiber Shells for Customizing the Appearance of a Vehicle," filed Aug. 31, 2015, which is a continuation application of U.S. patent application Ser. No. 13/851,701, entitled "Carbon Fiber Shells for Customizing the Appearance of a Vehicle," filed Mar. 27, 2013, now issued as U.S. Pat. No. 9,120,517, which claims the benefit of and priority to U.S. Provisional Patent Application Ser. No. 61/616,992, entitled "Carbon Fiber Shells for Customizing the Appearance of a Vehicle," filed on Mar. 28, 2012, the entire disclosure of each of which is hereby expressly incorporated by reference herein.

FIELD OF THE DISCLOSURE

This patent generally relates to a vehicle body component and a method of manufacturing a vehicle body component, and in particular, a vehicle body component, such as a vehicle body panel, that includes an electronic component, such as an electronic light or an electronic sensor, integrated therein, and to a method of manufacturing a vehicle body component to include an integrated electronic component.

BACKGROUND

Vehicle owners, and especially automobile, bicycle, recreational vehicle, all-terrain vehicle (ATV), jet ski vehicle, and motorcycle owners, often customize the appearance of components of their vehicles beyond the offerings provided by original equipment manufacturers (OEMs). Customizing the appearance of components of a vehicle, such as bicycle frames, motorcycle tanks or fenders, automobile panels, bumpers, rockers, etc., adds a degree of individuality to the vehicle that is valued by owners, especially when the vehicle model is broadly available to the public. These customizations can differentiate the vehicle in a racing competition, indicate membership in an organization, indicate an official status such as a police officer, or simply express the personality or style of the vehicle owner to others. Despite the large number and variety of customizations available in the marketplace, a few common customization characteristics are generally most valued by consumers. The value added to a customized vehicle often lies with the extent of customization, the quality of the modification, the tools and skill set required to perform the customization, and the cost to the owner. Moreover, other important customization characteristics considered by vehicle owners when attempting to customize their vehicles is the amount of downtime that the vehicle must experience to perform the customization and whether the customization is a permanent modification or a revisable modification of the vehicle. Owners value the time they have to use their vehicles, and so customizations that require excessive downtime of the vehicle, i.e., that require the vehicle to be unusable for their intended purpose for a long period of time during the customization process, are undesirable.

The most obvious and well-known manner of customizing the appearance of a vehicle or of a vehicle body component, such as the front and back fenders, side panels, hood, rear, etc. of an automobile, is to repaint the vehicle body components. In many cases, this type of customization requires the owner to disassemble the vehicle and apply a custom paint job to the body components. The custom paint job may include a new shade, color or pattern of paint and/or may include artist designs, such as depictions of animals, logos, stars, or other artistic renderings. In order to be of a high quality, custom paint jobs must typically be performed by a professional, which can be cost prohibitive for many vehicle owners. This type of customization also typically requires excessive downtime, because the vehicle needs to be disassembled, parts thereof must be sent to a professional to apply paint, and the vehicle must be reassembled. To return the vehicle to the original configuration, the owner would need to strip the paint from the repainted surfaces and have the original finish re-applied, which may or may not be possible, and which again may be cost prohibitive.

Various other manners of customizing a vehicle or a component of a vehicle have been developed in an attempt to reduce some of the problems associated with customized paint jobs. For example, a vehicle customization technique that has been developed uses preformed or premade shell covers made of plastic or fiberglass that may be applied over an original vehicle component and attached thereto with adhesive, for example. However, there are still numerous problems associated with these types of shell covers or bolt-on parts. These types of parts are typically made of plastic or fiberglass, which detracts from the look or function of the original vehicle component because in many cases these shells or other parts must be constructed to be of unacceptable thickness to be sturdy enough for mounting on the vehicle. In particular, shell covers made of plastic or fiberglass must be manufactured to be of a minimum thickness on the order of ¼ inches, which when applied over the original vehicle component, make the vehicle component look unacceptably larger than the original, thereby detracting from the original design of the vehicle. Other vehicle component covers cannot be formed to match the shape or curves of the original vehicle component on all sides thereof, again altering the look of the original design of the vehicle in an unacceptable manner.

One technique for customizing a vehicle, such as an automobile, that is becoming more common, is to replace vehicle body components, such as fenders, side panels, hoods, doors, etc., of the vehicle with carbon fiber components, or to make these vehicle components as carbon fiber components in the first place, with the carbon fiber components being made in the same shape as the original component or with a similar but different shape to add a distinctive look to the vehicle body component. In other cases, carbon fiber body components may be manufactured and added to a vehicle as an add-on part that is mounted over or onto another original body component of the vehicle. The use of carbon fiber as the underlying structural material of the body component typically results in a lighter weight body part or component, that is actually stronger than the material (e.g., metal, aluminum, fiberglass, etc.) commonly used to make vehicle body components. Moreover, carbon fiber body parts have a distinctive look, as they generally appear, from a distance, as a single color, but include a weave pattern of carbon fiber strips that is visible to a viewer at closer ranges. Advantageously, carbon fiber body components can also be painted and otherwise customized in typical manners. Because carbon fiber body parts are typically thinner and lighter in weight than similar body parts made of other common materials, carbon fiber body parts are used more and more commonly in high performance vehicles, such as in race cars, high end street cars, etc.

Unfortunately, manufacturing carbon fiber body components is not an easy or highly automated process, and so is typically used sparingly in standard, mass marketed vehicles. In particular, to produce a carbon fiber body panel, a set of carbon fiber sheets (made of a weave of carbon fiber strips) are laid down on or over a mold in the shape of the exterior of the body component being formed. Typically, four or more such carbon fiber sheets are used and, in high quality applications, the carbon fiber sheets are pre-impregnated with resin, typically at a 70/30 ratio of carbon fiber to resin. In fact, it has been found that the use of carbon fiber sheets pre-impregnated with resin at a 70/30 ratio results in the strongest carbon fiber component when the carbon fiber component is fully formed. While, in some cases, it is possible to lay down carbon fiber sheets that are not pre-impregnated with resin onto a mold, and then flow resin through the sheets after these sheets have been place onto the mold, it is very difficult to control the carbon fiber/resin ratio in these cases, typically resulting in carbon fiber body components with inferior strength properties.

It will be understood, however, that to produce a high quality carbon fiber component, the carbon fiber sheets need to be laid down as a sheet over the mold with no or only minimal creases, folds, etc. As such, the more curves that are in the mold, the smaller the radius of curvature of the curves in the mold, and the more complex curves that are in the mold make it harder and harder to lay down the carbon fiber sheets in a manner that does not result in folds, creases, etc. within the sheets. While the sheets can be stretched a bit in order to accommodate curves in the mold, in some cases, the sheets must be cut to be adjusted to the curves of the mold so as to prevent folds or creases in the sheets and to make the fiber weave of the sheets look continuous or nearly continuous over, in, or through the curves of the mold. This process requires a skilled manufacturer in cases in which the molds have complex or tight curves.

In any event, after the sheets are laid down onto the mold, and the resin is added (either through the pre-impregnation of the sheets or via flowing resin through the sheets after being laid down over the mold), the carbon fiber sheets and the mold are wrapped and sealed in plastic (such as in a sealed plastic bag). Thereafter air and other gases are removed from the bag by, for example, a vacuum evacuation process that removes all or most of the air and other gases from the inside of the sealed bag to thereby vacuum seal the interior of the bag.

Next, the entire assembly of the mold, sheets, resin, and sealed bag is cured to form a hardened carbon fiber component. The curing can be performed using heat and/or high pressure. In particular, the assembly may be placed into an oven and/or into an autoclave, such as a hyperbaric chamber, where it is subjected to heat (in the oven) or to increased pressure (produced within the hyperbaric chamber of the autoclave). In either case, the assembly is heated and/or pressurized to cure the resin around the carbon fiber sheets to thereby harden the resin into a solid component with the carbon fiber sheets disposed therein. Moreover, when an autoclave is used, the pressure within the hyperbaric chamber forces the resin to come out of the carbon fiber sheets and to flow down towards the surface of the mold. The heat and/or pressure simultaneously bakes the resin which eventually hardens into a stiff or solid material with the carbon fiber sheets therein providing strength to the final component. Once baked or cured, the component has an exterior layer of (typically clear) resin formed over or on top of the carbon fiber sheets which are still disposed within the hardened resin at the back side of the component. When the resin cures as a clear substance, the carbon fiber weave of the topmost carbon fiber sheet is typically visible through the hardened resin, providing a distinctive look to the component, while the carbon fiber sheets give superior strength characteristics to the final component.

While vehicle components customization has been generally an individual pursuit, OEMs are increasingly offering vehicle customizations to differentiate one make of a vehicle from a competitor. For example, another manner of customizing a vehicle without changing an overall shape or method of manufacturing the vehicle is by changing the design of the headlights and other exterior and interior lighting features of the car. For example, a vehicle customization technique offered by some OEMs is to change interior lighting features and visual effects of brake lights, headlights, dashboard lights, and internal car lights. In some cases, additional lights or lighting features are added to the vehicle, such as beneath the frame, around the license plates, etc. However, such customizations are largely limited to altering previously-installed lighting components or mounting additional light fixtures on or to the exterior of the vehicle.

SUMMARY

A vehicle body component is formed or manufactured to include an electronic component, such as an electronic light, an electronic sensor, an electronic graphical display screen, etc., integrated therein in order to provide a highly customized look to the component or to provide a highly customized functionality to the component, or to the vehicle on which the component is mounted, while being integrated into the vehicle body component in a manner that enables the component to have a smooth surface, with no visible or tactile creases, lines, folds, gaps, etc. In some cases, the integrated feature may be a lighted feature having a light disposed to provide or to illuminate a graphical design visible from an exterior side of the body component, to thereby change the appearance of the component or the vehicle on which the component is installed, such as an automobile, a bicycle, etc. The body component may be a component that is permanently installed as a vehicle body part, or that is permanently or non-permanently installed over an existing vehicle body part. In other cases, the integrated electronic component may include an electronic component in the form of a sensor that provides added functionality, such as sensing a fingerprint, sensing exterior or ambient conditions of the vehicle, sensing touches to the vehicle, etc., and this sensor can be used to provide additional functionality to the vehicle (such as providing a touch sensitive locking or unlocking mechanism, detecting water or other liquids on the surface of the body component, etc.), all while being nearly undetectable to the touch, and thus providing a clear smooth and uninterrupted surface of the vehicle body component.

In one case, the vehicle component may be made by depositing one or more layers, such as four layers, of a composite material, such as resin pre-impregnated sheets of a carbon fiber weave, to a mold in the shape of a body part to be manufactured, while integrating an electronic component, such as a light, a lighting material, and/or an electronic sensor, in between two or more of the layers of composite material or within the various layers of the composite material. A recess, such as a void, may be cut into or formed into one or more of the layers of material and the electronic component may be disposed into the void. If desired, a lens may also be disposed within or placed into the void so that the light or sensor lies behind the lens when viewed from the exterior side of the component being formed. The lens may be colored, clear, or may have different areas of transparent, semi-transparent, opaque, or even non-light conducting areas that filter or propagate light in different manners to thereby create a design or other visual lighted display. One or more filters may be placed within the lens or between the lens and the light to provide additional design features, such as different colors, patterns, etc., to the graphical image or design.

In one case, the electronic component is a lighted component, such as a light emitting diode (LED) light source, an incandescent light bulb, a neon light bulb, an electroluminescent tape, an electronic digital display such as an organic light emitting diode display (an OLED display), etc. Moreover, the vehicle body component may be made as a carbon fiber component which is formed to include a lighted design therein or in which a lighted design is integrated within the carbon fiber component. As an example, a particular lighted design may be formed as a recess, such as a void, directly into first and second layers (for example) of carbon fiber sheets used to create the vehicle body component, and a lighting feature may be placed into the void so that the lighting feature is seamlessly incorporated with the vehicle body component after curing of the carbon fiber sheets. In some cases, the lighting feature may include a lens that is placed in the void in the shape of a particular design, with an electronically energized light or lighted component disposed behind the lens. In these cases, the visual effect created by the lighting feature may be changed or accomplished by controlling the lighting effects produced by the lens, by adding filters to the lens, or behind the lens to change the color and/or visual effects of the light traveling through the lens, and by incorporating various different types of lighting devices to produce different visual effects. Moreover, different visual effects may be created by energizing the lighting feature in different manners, such as by blinking or strobing the light, sending one or more different images to a lighting feature in the form of a digital display, changing the intensity of the light emitted by the light, etc.

Additionally, in other cases, lights, lighting features, and/or sensors may be incorporated into or formed into various layers of a composite material, such as carbon fiber sheets, prior to the material being cured or hardened, and these lights, lighting features, and/or sensors may be connected to one or more electrical or control systems of the vehicle to provide certain functions for the vehicle, such as indicating a turn-signal, automatically illuminating the lighting material in dark environments, activating an alarm, detecting an unlocking command via a fingerprint sensor, etc.

BRIEF DESCRIPTION OF THE DRAWINGS

FIG. 1B illustrates a cross-sectional view of an embodiment of one of the electronic components of FIG. 1A in the form of an electronic lighting feature.

FIG. 1C illustrates a cross-sectional view of another embodiment of one of the electronic components of FIG. 1A in the form of an electronic lighting feature with a lens.

FIG. 1D illustrates a cross-sectional view of an embodiment of one of the electronic components of FIG. 1A in the form of an electronic sensor component.

FIG. 4A is cross-sectional view of a first example of a layered assembly of a vehicle body component with an integrated lighting material or component prior to curing.

FIG. 4B is a cross-sectional view of the vehicle component of FIG. 4A after curing.

FIG. 5 is a cross-sectional view of a second example of a vehicle body component having an integrated lighting component.

FIG. 6 is a cross-sectional view of a third example of a vehicle body component with an integrated lighting component that is shaped to a contoured mold.

FIG. 7 is a cross-sectional view of a fourth example of a vehicle body component with a removable electronic lighting device disposed in the vehicle body component.

FIG. 8 is a cross-sectional view of the vehicle body component of FIG. 7 with the removable lighting device removed from the vehicle body component.

FIG. 9 is a cross-sectional view of a fifth example of a vehicle body component with a removable lighting device.

FIG. 10 is a cross-sectional view of the vehicle body component of FIG. 8 with a removable lighting device having a filter.

DETAILED DESCRIPTION

Figure 1A:
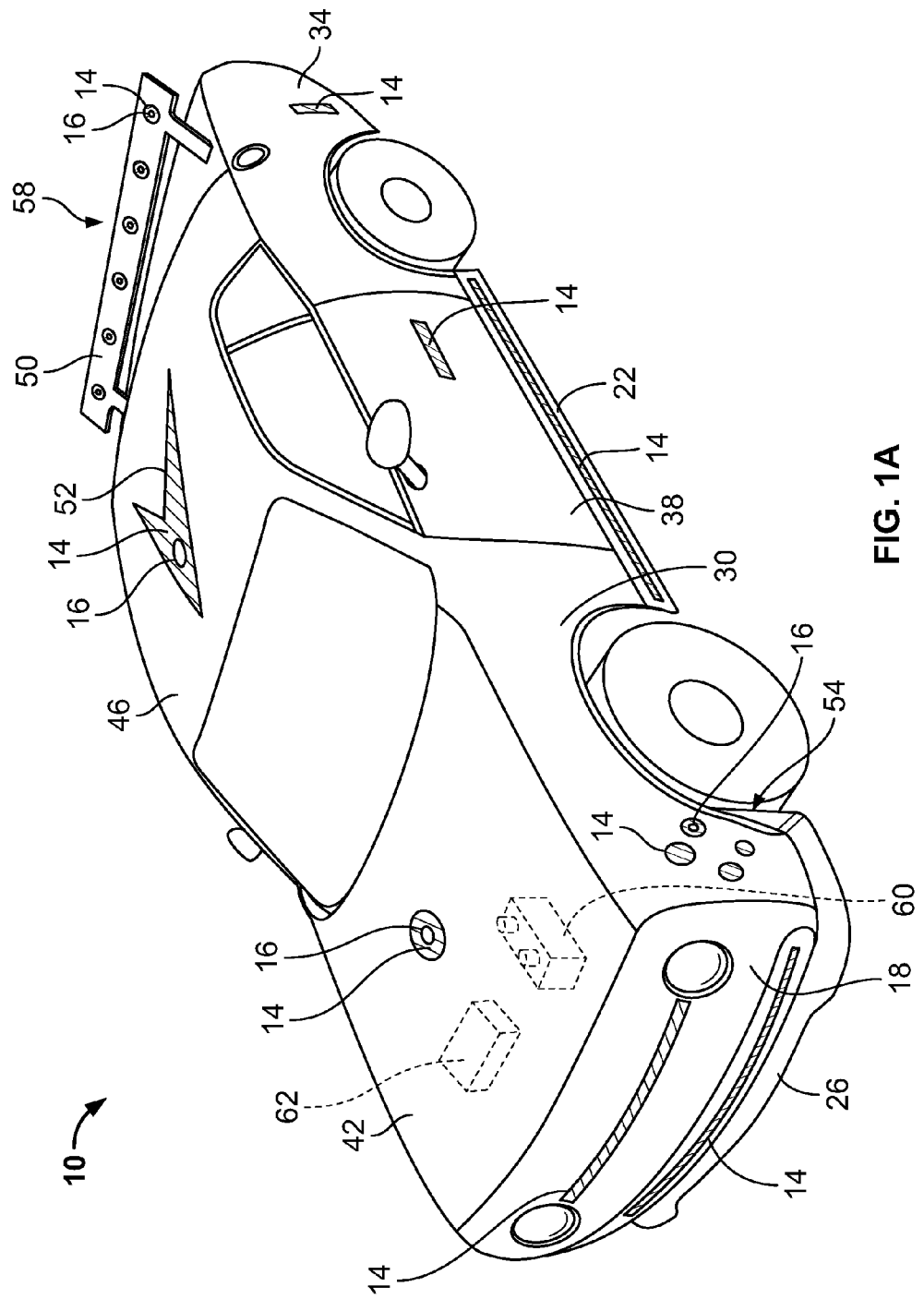
FIG. 1A illustrates an example vehicle body with integrated electronic components in the form of lights and sensors disposed within various ones of vehicle body components of the vehicle body.

FIG. 1A illustrates a customized vehicle body 10, specifically in the form of a two-door automobile body, having different visual lighting and sensor features 14 integrated into different vehicle body components of the vehicle body 10. The vehicle body components of the vehicle body 10 may be custom-manufactured body parts, such as a bumper 18, a rocker 22, a splitter 26, front and back fenders 30, 34, a car door 38, a hood 42, and a roof 46; or the vehicle body components may be shells or other aftermarket attachments, such as a spoiler 50, that are mounted on or over existing body components of the vehicle body 10. The integrated electronic features 14 may provide or display a visual or artistic design using, for example, light sources, lighting materials, or electroluminescent materials that are energized in a manner explained in greater detail below. In this case, the visual or artistic design may include a particular color and/or pattern of colors that are visible from the exterior surfaces of the vehicle body 10, and may also or instead include an artistic rendering of some kind, such as one or more logos, words, signs, symbols, mascots, visual themes, animals, or other artistic renderings. Still further, the integrated electronic features 14 may provide or include a digital display, such as an OLED display that may be energized to provide different visual images or other effects that are visible from the exterior of the body 10. The integrated electronic components 14 may be a light source, such as an LED, or the electronic component may interact with a light source, to provide a visual lighting effect, such as a fiber optic tube illuminating when it interacts with an LED, for example.

In still other cases, the integrated electronic features 14 may include a computer chip, an antennae, or electronic sensors of various types that sense various parameters, conditions, stimuli, physical phenomena, etc. present at the exterior of the vehicle body 10. In some cases, for example, the electronic sensors may include a fingerprint sensor, a capacitive or other touch sensor, a light sensor, proximity sensor, image recognition sensor, fingerprint recognition sensor, a pressure sensor, an infrared sensor, a temperature sensor, a liquid sensor, a crash sensor, an integrity sensor (e.g. a yaw sensor for driving assistance or a strain gauge for structural monitoring) etc., to sense stimuli or other physical elements on the exterior of the vehicle body 10 at or near the location of the sensor. While not shown explicitly in FIG. 1A, the electronic components or features 14 may be electronically connected to one or more energization or power circuits 60 (depicted in dashed lines in FIG. 1A) such as a vehicle battery, a stand-alone battery, a solar cell, etc., which power the electronic components. Moreover, the electronic components or features 14 may be connected to and may be controlled by one or more control circuits 62 (depicted in dashed lines in FIG. 1A) which operate to control the electronic features 14 in various different manners depending on the type of and the use of the electronic features 14. In some cases, the electronic features 14 may be connected to one or more existing control circuits of the vehicle 10, such as to turn signal energization circuits, locking and unlocking circuits, alarm circuits, headlight, running light, tail light, etc. circuits, battery circuits, etc., of the vehicle 10. In these cases, the electronic features 14 may be energized and may operate in conjunction with these circuits to perform various functionalities associated with these circuits including, for example, providing lights or lighted designs at the exterior of the vehicle, sensing inputs for these circuits, such as touch inputs to open doors, unlock doors, roll down windows, turn on or off alarms, etc.

In other cases, the electronic features 14 may be connected to stand alone or separate circuits and thus, may operate independently of the other circuits of the vehicle 10. In some cases, for example, the electronic features 14 may be lights or lighted features connected to a separate battery or other energization circuit which energizes the light or lighted feature all of the time, during low light conditions, intermittently, in response to exterior stimuli, etc. In still other cases, one or more of the electronic features 14 may be a solar panel or a solar cell that collects and stores energy for powering other ones of the electronic features 14 or for powering a light or other electronic component of the same electronic feature 14. In another case, one of the electronic features 14 may include a chipboard with one or more connected electronic devices (e.g. a light feature, sensor, a keyboard, a processor, or a combination of the electronic devices).

In the example vehicle of FIG. 1A, the vehicle body 10 includes different lighting features 14 that display a particular design by incorporating lighting material 16 built into, or integrated with, a body component of the vehicle body 10. The lighting material 16 is configured to electrically connect to a power source hidden from external view, such as a battery or the electrical system of the vehicle, and is integrated into the vehicle body component made of, for example, a composite material so that each vehicle body component has a smooth exterior surface. For example, the roof 46 of the vehicle body 10 of FIG. 1A may be manufactured by the OEM or may be a shell configured to attach to an existing roof of the vehicle body 10. The lighting feature 14 of the roof 46 includes, in the example of FIG. 1A, an arrow design 52 that may be illuminated when the lighting material 16 of the lighting feature 14 of the roof 46 is energized. In other examples, the front fender 30 is customized to include a circular lighting design 54, and the spoiler 50 is customized to include a strip of round lights 58. As used herein, the term "lighting feature" may include the lighting material (e.g. an LED, fiber optic tube, an electronic display, a strip of electroluminescent tape, etc.), and may, in some cases, include a filter and a lens, all configured to form a lighted design. The terms "light" and "lighting material" refer to any material with or without a light source that contributes to the overall lighting feature of the vehicle component.

Still further, in one example, one of the electronic features 14 on, for example, the door body component 38, is an electronic touch sensor component that detects a touch event on the exterior of the door body component 38. This touch sensor component may be used as part of a touch pad having various numbers thereon to enable a user to enter a code to lock or unlock the door of the vehicle, to read a fingerprint of the user to lock or unlock the door of the vehicle, etc. Of course other sensors, such as any of those mentioned above may be used as part of any of the electronic features 14, including light sensors, solar panels or solar cells, pressure sensors, capacitive sensors, etc., and these electronic sensors may be used for any of various functionalities, such as turning on or off lights or lighted features, setting off or disabling electronic alarms, locking or unlocking doors, opening or closing windows, etc.

FIG. 1B illustrates a cross-sectional view of an integrated electronic component 80 which may be one of the electronic features 14 of FIG. 1A and which, in this case, is in the form of a simple electronic light. As illustrated in FIG. 1B, the integrated electronic component 80 of FIG. 1B may provide or display a lighted visual or lighted artistic design at the exterior (in this case at the top edge as depicted in FIG. 1B) of the component 80. In particular, the element 80 of FIG. 1B is in the form of a carbon fiber component having a cured layer of resin 82 formed over four layers or sheets 84 of carbon fiber weave. As will be understood, the resin layer 82, is made of resin that, when baked under heat and/or pressure during the curing process, flowed from pre-impregnated sheets of carbon fiber 84 to form the outer layer of the component 80. More particularly, the resin layer 82 forms a smooth outer surface 85 of the component 80 with no seams, gaps, or creases therein. Moreover, the component 80 includes an electronic light 86, which may be an LED, an incandescent light, a CFL light bulb, a neon light bulb, a florescent light bulb, etc. In other cases, the electronic light 86 may be an electroluminescent tape, or may be any other light source that emits light when an electrical voltage is applied across the element or when an electrical current is applied through the element. As illustrated in FIG. 1B, the light component 86 may be disposed in a recess, such as a void, within the resin layer 82 and/or one or more of the carbon fiber layers 84. Moreover, a set of wires or other electronic energization leads 88 that connect the electronic light 86 to a source of energization (not shown in FIG. 1B) and may be fed through or disposed between two of the carbon fiber layers or sheets 84 and may, at some point, exit from the component 80 such as from the back of the component 80 to connect to a source of energization, to a control circuit, etc. The leads 88 may be two or more leads depending on the type of light source 86 and circuit. In the case of FIG. 1B, the light waves which are created by the light source 86 when energized, may exit from the component 80 through the resin layer 82 and be visible from the exterior of the component 80. The light 86 may be formed to emit a particular color or type of light and/or the light 86 may be formed in a particular pattern or design to emit that design through the resin layer 82. For example, the light 86 may be a neon bulb that forms a design or word that is visible from the exterior of the component.

As another example, FIG. 1C illustrates a component 90 that is similar to the component 80 of FIG. 1B with like elements having the same reference numbers. In this case, the lighting feature includes a lens 92 disposed between the light source 86 and the resin layer 82. The lens 92 may provide different visual lighting effects when used in conjunction with the light source 86. For example, the lens 92 may be etched or formed to be or to have different areas that have varying degrees of translucent, opaque, transmissive, etc. properties. The lens 92 may be flat, curved, oval, etc. and may be of any desired shape to form any desired lighted design. The lens 92 may be any degree of thick or thin, and may be used to define the outline or edges of a design or lighted design to be illuminated at the exterior of the body component 90. The lens 92 may be formed in the shape of a design to be lighted and/or may have an, inner and/or outer surface that is etched, colored, or otherwise, formed to emit light in a particular pattern, color, design, etc. Moreover, the light source 86 of FIG. 1C may be any desired type of light source that may be used with the lens 92 to emit a pattern or color or other design. For the sake of illustration, the body component 90 is illustrated as including five layers of carbon fiber sheets 84 to indicate that any number of carbon fiber sheets (e.g., from one to ten, for example), may be used to produce the body component 90. Still further, the leads 88 from the light source 86 are illustrated as being disposed between the second and third layers of carbon fiber sheets 84 for a short distance and then exit the back of the component 90 via holes in the third, fourth, and fifth layers of the carbon fiber sheets 84.

Still further, FIG. 1D illustrates a component 95 that includes a sensor 96 disposed in a recess, such as a void, within the component 95. In this case, the sensor 96 may be any type of sensor, such as a capacitive sensor, a touch sensor, a fingerprint sensor, a solar cell, a light sensor, etc. Still further, the sensor 96 may be disposed behind or within a lens or other enclosure (not shown in FIG. 1D), or may be formed to contact and/or to be at least partially within the resin layer 82. Of course, electronic leads 98 may be connected to the sensor 96 and may be disposed between two of the carbon fiber layers 84 and/or may exit through a hole or other cut-away within the carbon fiber layers 84 directly behind the sensor 96 as illustrated in FIG. 1D. These leads 98 may connect the sensor 96 to a control circuit and/or to an energization circuit, such as the circuits 60 and 62 of FIG. 1A. Instead of a single sensor, a chipboard may be disposed in the void within the component 95 with a plurality of electronic devices attached and/or in communication with the chipboard.

Figure 2:
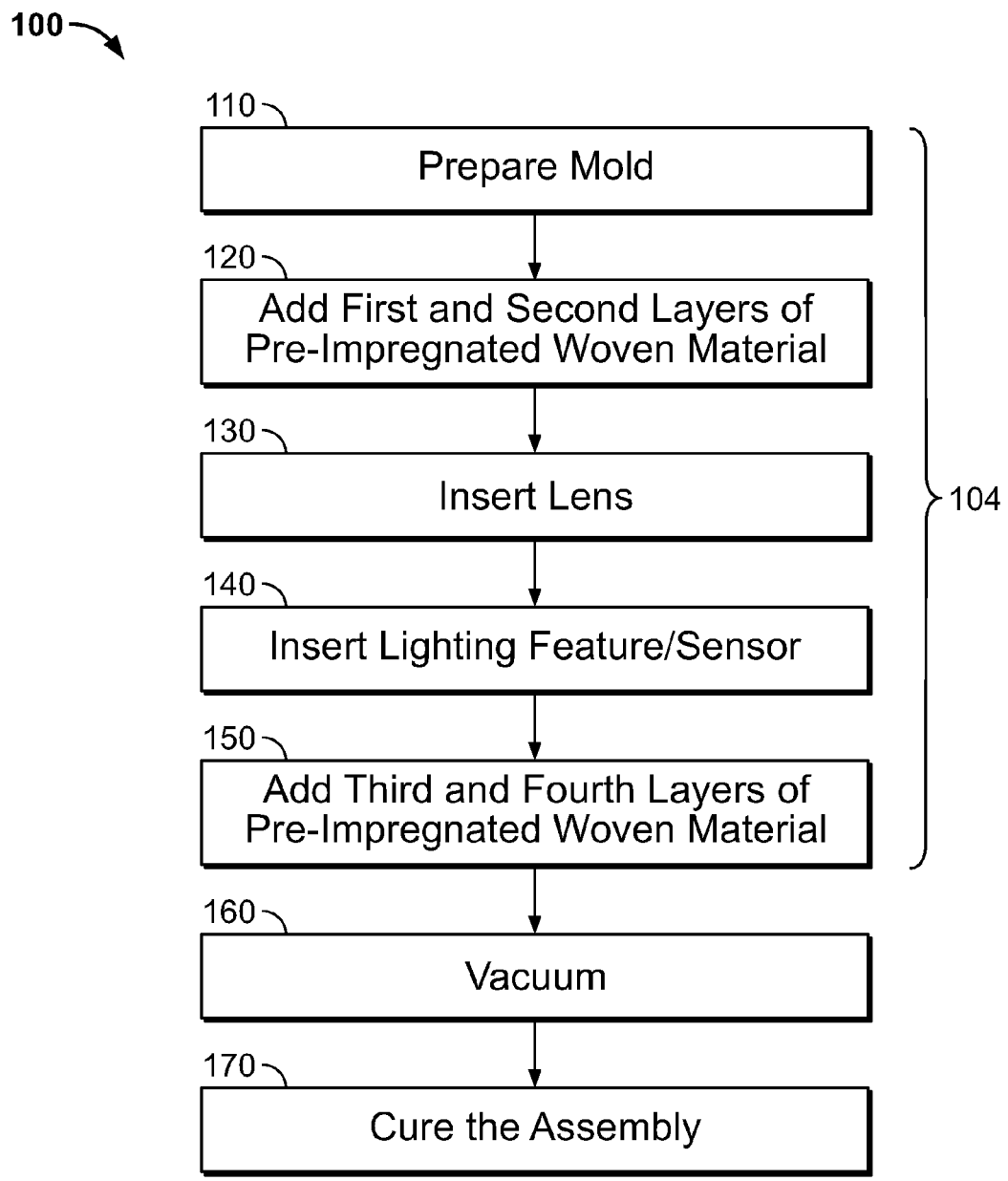
FIG. 2 is a schematic diagram of one process or method for manufacturing a vehicle body component with electronic lighting or electronic sensor components integrated therein.

An example method 100 or process of manufacturing a customized vehicle component having integrated electronic components or features 14, such as any one of the vehicle body components illustrated in FIG. 1A, is depicted in a schematic diagram in FIG. 2. Generally speaking, the method 100 includes three main phases: an assembly phase 104, a vacuum phase 160, and a curing phase 170, and will be described in conjunction with manufacturing a carbon fiber body component. (However, similar method steps could be used to manufacture other types of composite body components, including Kevlar body components, fiberglass body components, etc.) The assembly phase 104 of the example method of FIG. 2 includes steps 110, 120, 130, 140, and 150 and will be described in detail and with reference to FIG. 3, which is an exploded layered assembly 200 for manufacturing a car hood 42 of FIG. 1A with a lighted feature 14. The vacuum and curing phases 160, 170 may include known methods and techniques for finishing the vehicle component so that the component is ready for market.

In FIG. 2, the assembly phase 104 initially includes a step 110 of providing a mold 202 (FIG. 3) of a vehicle component, which in this case is a hood of an automobile body, where the mold 202 includes a contoured interior side 206 and may be coated with a wax or non-stick coating so that the pre-impregnated composite material does not bond or stick to the mold 202 during the curing step 170. Further, the method of FIG. 2 includes a step 120 of adding first and second layers 210, 214 of pre-impregnated composite material, such as pre-impregnated carbon fiber (shown in FIG. 3), to the interior side 206 of the mold 202. In particular, a first layer 210 of pre-impregnated composite material (e.g., a sheet of carbon fiber weave pre-impregnated with resin preferably at a 70/30 fiber/resin ratio) with a top side 218a and a back side 218b is added to the interior side 206 of the mold 202, where the top side 218a of the first layer 210 is adjacent to the interior side 206 of the mold 202. A second layer 214 of pre-impregnated composite material (a sheet of carbon fiber weave) with a top side 222a and a back side 222*b* is added to or on top of the first layer 210, so that the top side 222*a* of the second layer 214 is adjacent to the back side 218*b* of the first layer 210. The composite material (carbon fiber weave) may be configured to flex, bend, and fold to permit each layer 210, 214 to lay onto the interior side 206 of the mold 202 and bend with each contour. Applying heat to the layers 210, 214 may allow the layers to "give" easily and better form to surfaces of the mold 202 with more contours. Typically, each layer of pre-impregnated carbon fiber may have a top side and a back side, and the top side typically includes a film coating and the back side typically includes a fabric side. As used herein, the term "top side" when referring to a pre-impregnated composite material may refer to the top film side of the material if the material includes both the film side and fabric side.

Figure 3:
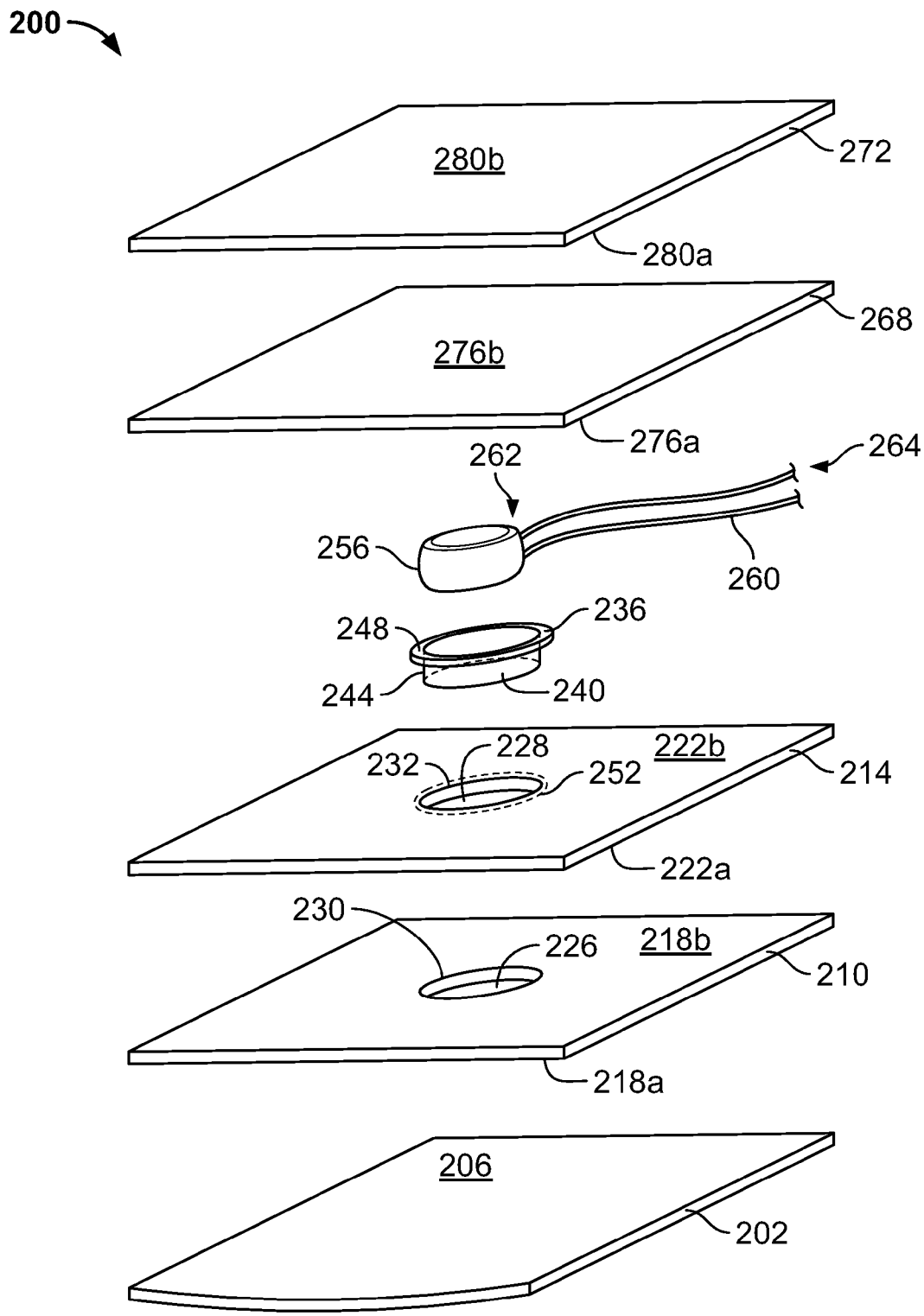
FIG. 3 is an exploded view of one example of assembling a vehicle body component with a lighting material or component integrated therein.

The method 100 may include an additional step of removing a portion of the first layer 210 in a shape of a design or other feature and removing a portion of the second layer 214 in the shape of the same design or other feature. As shown in FIG. 3, the first layer 210 and the second layer 214 each have a portion removed from the layer forming a recess, such as a void 226, 228, in the shape of an oval design, and the void 226, 228 in each layer 210, 214 may be removed prior to the step 120 (FIG. 2) of adding the layers to the mold 202. Alternatively, the step of removing a portion of the first layer 210 and the second layer 214 may be performed after the first and second layers 210, 214 are added to the mold 202, for example, when the layers 210, 214 are stacked. A laser cutter, a water jet cutter, and/or a Computer Numeric Control (CNC) machine with a cutting tool may be programmed to cut each void 226, 228 in the shape of the design in each layer 210, 214. Each of the voids 226, 228 includes an outer edge 230, 232 of the pre-impregnated composite material layer 210, 214 that aligns with the outer edge 232, 230 of the adjacent layer 214, 210 to form a design void. The design recess is the outline of the desired shape of the lighting feature design and provides a compartment to hold the lighting material within the vehicle body component. The design recess is formed when the first and second layers 210, 214 are stacked such that the outer edge 230 of the first layer 210 is adjacent to the outer edge 232 of the second layer 214, or when the back side 218*b* of the first layer 210 is adjacent to the top side 222*a* of the second layer 214. The design recess is defined by the adjacent outer edges 230, 232, which form a design wall extending between the top side 218*a* of the first layer 210 and the back side 222*b* of the second layer 214. The design wall encloses the design recess, and therefore the lighting material, within the vehicle component body.

Optionally, the method 100 may include a step 130 (FIG. 2) of inserting a pre-cut lens 236 into the design recess formed in the first and second layers 210, 214. Inserting the lens 236 includes inserting a top portion 240 of the pre-cut lens 236 into the design recess such that an outer edge 244 of the top portion 240 corresponds to the design shape of the design wall. The outer edge 244 of the lens 236 is configured to engage the design wall and the top portion 240 is configured to fit entirely within the design recess such that the outer edge 244 of the lens 236 and the design wall are immediately adjacent to one another without intervening gaps between the abutting surfaces. The lens 236 includes a lip 248 that extends outwardly from the outer edge 244 and is configured to abut against a portion 252 (shown in dashed lines) of the back side 222*b* of the second layer 214 that surrounds the void 228. The lip 248 is configured to hold the lens 236 within the design recess and to suspend the lens 236 adjacent to the interior side 206 of the mold 202 without falling through the void 228. As will be described in detail below, modifying and customizing the lens 236 may enhance or provide certain design features, details, colors, opacities, and/or variations in light brilliance to the visual effect of the lighting feature. The lens may be manufactured individually or in bulk, and may be sized according to the desired thickness of the finished vehicle component so that the lens does not protrude through the outer surface after the component is cured. Other example methods of manufacturing a vehicle component may omit the step 130 of inserting a lens 236 because the lens 236 may inhibit the functionality of a sensor, for example, a touch-sensitive sensor. In this case, a protective membrane may be inserted instead of a rigid lens or no intervening material may be used.

The assembly phase 104 further includes a step 140 (FIG. 2) of placing a lighting material within the design recess, where the lighting material is configured to illuminate within the design recess when powered. The step 140 may include providing a light emitting diode (LED), a touch screen, an LCD screen, a phosphor crystals lighting device, and/or other known lighting devices or light sources into the design recess formed in the first and second layers 210, 214. The lighting material 256 may fit completely within the design recess, or the lighting material 256 may protrude beyond the back side 222*b* of the second layer 214, as shown in more detail in FIGS. 4A and 4B. The step 140 of inserting the lighting material 256 may include providing wiring 260 with a first end 262 connected to the lighting material 256 and a second end 264 configured to connect the lighting material 256 to a power source, a control circuit, etc. The step 140 of placing the lighting material 256 may be performed after the second layer 214 is added without including the step 130 of inserting a lens 236, or the step 140 may be performed subsequently to inserting the lens 236 into the design recess. In another example of a vehicle component, the design recess may be shaped to an outer dimension, such as a circumference, of the lighting material such that the lighting material is flush with or engages the design wall. In this case, a lens may not be necessary to achieve the desired visual effect that can be achieved with, for example, an LED of a suitable size, color, and brilliance.

The step 140 previously described may be performed by also placing a chipboard and/or a sensor into the design recess with, or instead of, the lighting material 256. A vehicle component with an integrated chipboard or sensor may provide a number of desirable functionalities accessible to an exterior surface of the car. For example, a car door having an integrated touch sensor may be visibly undetectable, but may provide a user with the ability to open a car door or turn the ignition on by simply pressing a spot on the exterior of the car door to activate the sensor. In the figures, a sensor may be incorporated instead of a lighting material 256, where the sensor may have a front side that is activated by a stimulus and a back side that is electrically connected to wiring. Thus, rather than incorporate lighting material into a body of a vehicle component, the vehicle component may be manufactured to include an integrated sensing mechanism. For example, a photoelectric sensor that is integrated into a bicycle frame may turn on a lighting feature of the bicycle and/or lighting material integrated into the bicycle frame, when the bicycle is in a dark environment. In another example, a motion sensor may be integrated into a car door and car paneling to sense when someone or something is approaching the car and may activate lighting or an alarm to alert the vehicle owner. In yet another example, a sensor and a lighting feature may be placed within a design cavity and configured to be electrically connected such that if the sensor detects that someone or something is approaching the vehicle, then the processor on the chipboard may turn on the integrated lighting material. The step 140 may also or instead include integrating one or more chip boards or processors or other electronic components into one or a number of different vehicle body components.

In any event, the assembly phase 104 (FIG. 2) includes a step 150 of adding a third layer 268 of pre-impregnated composite material and of adding a fourth layer 272 of pre-impregnated composite material. The third layer 268, which includes a top side 276a and a back side 276b, is added to the back side 222b of the second layer 214. A portion of the top side 276a of the third layer 268 is adjacent to the lighting material 256, providing a lighting material backing and enclosing the lighting material 256 within the design recess. The third layer 268 may provide a visually solid background to the feature 14 such that when the lighting material 256 is not illuminated, the composite material of the third layer 268 is visible through the design recess of the vehicle body component. Similarly if a sensing mechanism is incorporated, the third layer 268 helps to camouflage the sensor and/or chipboard, as described above, with the solid background of the composite material. The step 150 also, in this case, includes adding a fourth layer 272 of pre-impregnated composite material to the back side 276b of the third layer 268. The fourth layer 272 includes a top side 280a and a back side 280b, where the top side 280a of the fourth layer 272 is adjacent to the back side 276b of the third layer 268, and the back side 276b may provide an inside surface of the finished vehicle component.

The assembly phase 104 of the method 100 may include additional or fewer steps than depicted in FIG. 2, and accordingly, the term "layered assembly" as used herein includes the first, second, third, and fourth layers of pre-impregnated composite material, a chipboard, lighting material, and/or sensor, and/or a mold. A "layered assembly" may also refer to the exploded assembly 200 of FIG. 3 which additionally includes wiring 260 connected to the lighting material 256 and a pre-cut lens 236. In another method, the design recess may not be formed in the first and second layers of pre-impregnated woven material. Instead, the lens and lighting material and/or sensor may be provided between the second and third continuous carbon fiber sheets. After curing, the lens and portions of the first and second layers of carbon fiber sheets adjacent to the lens may form a protrusion, or uneven surface, that may subsequently be filed down by a cutting machine or sander to provide a smooth outer vehicle component surface. In yet another method, the design recess may be non-flat structure, such as an indent or a groove shaped to receive and hold the electronic component. The design recess may be formed around the electronic component during manufacturing, or the recess may be formed by forming the carbon fiber sheets in a manner to create the desired size and shape of the design recess.

Other features, such as a lens filter, a spacer piece, additional layers of pre-impregnated composite material, Nomex honeycomb material, and other materials may be added to change the visual appearance and/or strength of the vehicle body component being manufactured, and therefore may also be considered as components of the "layered assembly." Moreover, prior to the final two phases of the method 100, a release film and a breather cloth may be added to outer layer of the layered assembly, such as the backside 276b of the fourth layer 272. The release film and breather cloth protect the layered assembly and absorb excess emissions released from the composite material during the curing phase 170.

It will be understood that the assembly process or assembly phase 104 described herein is described as using exactly four sheets of composite material (in this case sheets of pre-impregnated carbon fiber weave) with two of these sheets being cut to form a void around the chipboard, light source, or sensor element. However, any number of sheets or layers of material may be used, including one, two, three, five, or even more sheets. Moreover, any number of these sheets can be cut or used to form the void and any other number can be used to be placed over the back of the void after the chipboard, lighting material, sensor, etc. is placed into the void. In some cases (such as when the lighting material, chipboard, or sensor is very thin), it may not be necessary to cut any of the sheets to form a void, and instead a recess may be in the shape of an indentation or groove. When using carbon fiber sheets, four sheets is preferred for sufficient strength while minimizing thickness and weight. However, any number of sheets could be used, with the more sheets being used typically providing more strength to the final body component.

As mentioned previously, the vacuuming and curing steps 160, 170 of the method or process 100 may include known techniques and practices to professionally and efficiently finish a component and prepare the component for use. These steps 160, 170 remove any air gaps between each layer of pre-impregnated composite material and evenly shape the layers to the mold 202. Specifically, the layered assembly 200 is placed into a sealed plastic bag and connected to a vacuum such that the air gaps in the bag and between the different layers of the layered assembly are removed. During the curing step 170, the layered assembly 200 may be formed into the finished vehicle component by pressure treatment, heat treatment, or a combination of applied pressure and heat treatment. Under applied heat and/or pressure, a resin of the reinforced composite material liquefies and is drawn to the interior side 206 of the mold 202, and is generally evenly distributed around the top side 218a of the first layer 210. In one example, the vacuum sealed assembly may be placed in an oven or an autoclave and may be baked such that the first 210, second 214, third 268, and fourth 272 layers of pre-impregnated composite material cure to the shape of the interior side 206 of the mold 202, forming an integrated component having an integrated lighting feature and smooth exterior surface. The sealed assembly may be baked for up to eight hours at a temperature range of 85° C. to 140° C., and preferably for four to six hours at 100° C. Alternatively, the curing step 170 may include placing the layered assembly 200 in a high-pressure chamber of an autoclave, such as a hyperbaric chamber. For finishing, a clear coat may be added to the exterior surface of the component for UV protection.

As previously discussed, a number of different vehicle components may be made according to the example method 100 of FIG. 2, and FIGS. 4A-16 illustrate examples of vehicle components with integrated electronic components using various techniques to achieve different visual results. The following examples may be manufactured according to the example method 100, alternative methods previously described, and other methods described herein. Turning first to FIG. 4A, a layered assembly 300 is illustrated before being vacuum sealed and cured, and includes first 210, second 214, third 268, and fourth 272 layers of pre-impregnated composite material, a lens 236, a lighting material 318 disposed within a design recess, such as a void 314, and wiring 260 connected to the lighting material or light source 318. FIG. 4B illustrates a vehicle component 304 formed after vacuum sealing and curing the layered assembly 300 of FIG. 4A. After curing, the first 210, second 214, third 268, and fourth 272 layers of pre-impregnated composite material combine to form a solid body 306 having a plurality of bonded layers. The body 306 includes an exterior surface 308 adjacent to the top side 218a of the first layer 210, an interior surface 310 adjacent to the back side 280b of the fourth layer 272, and a design recess such as a void 314, formed in the first and second layers 210, 214. The lighting material 318 is located within the design recess 314 and between the third and the fourth layers 268, 272 of composite material and the exterior surface 308 of the body. Specifically, the lighting material 318 is illustrated as an LED light that slightly protrudes beyond the back side 222b of the second layer 214, and is enclosed between the third layer 268 and the lens 236. The LED light 318 is electrically connected to a dedicated set of wires 260 at a first end 262 of the wiring 260, and the second end 264 of the dedicated set of wires 260 is located externally from the body 306 and is configured to connect to a power source. As illustrated in FIGS. 4A-4B, the wires 260 are disposed between the second and third layers 214, 268 of pre-impregnated composite material, and specifically between the back side 222b of the second layer 214 and the top side 276a of the third layer 268. The lens 236 is configured to diffuse light emitted from the LED 318, and is located within the design recess 314 such that an exterior side 322 of the lens 236 is coplanar with the top side 218a of the first layer 210. The exterior side 322 is connected to the top portion 240 of the lens 236 and is disposed perpendicularly relative to the outer edge 244. The outer edge 244 of the top portion 240 of the lens 236 is disposed directly adjacent to a design wall 326 of the design recess 314 so there are no gaps or air pockets between the design wall 326 and the top portion 240 of the lens 236. The lip 248 of the pre-cut lens 236 is disposed between the second and third layers 214, 268 of the body 306 so that the placement of lens 236 remains within the design recess 314 during curing.

Comparing FIGS. 4A and 4B, a plurality of air gaps 330 between the first 210, second 214, third 268, and fourth 272 layers, and lighting material 318 are removed during the vacuum step 160 to force the layers 210, 214, 268 and 272 to become densely packed together. The resin infused within the pre-impregnated composite material liquefies during the curing step 170 and seeps toward the mold such that the resin forms a smooth exterior protective surface 308, as shown in FIG. 4B. The overall thickness of the cured assembly 304 is reduced, as well. For the protrusions or uneven surfaces formed by the third and fourth layers 268, 278 over the LED light 318, a sander or cutting machine may be used to smooth the interior surface 310 of the vehicle component.

FIG. 5 illustrates a second exemplary vehicle component 400 after being formed and cured, and includes a body 404 made of a first 408, second 412, third 416, and fourth 420 layers of composite material. A lens 424 is disposed within a design recess, such as a void 428, formed in the first and second layers 408, 412 and a lighting material 432 is disposed in the design recess 428 between the lens 424 and the third and fourth layers 416, 420 of composite material. An outer layer of resin 434 is formed over the layer 408 and the lens 424. In comparison to the lighting material 318 of the vehicle component 304 of FIG. 4B, the lighting material 432 in FIG. 5 is flat strip of lighting material, such as electroluminescent tape or a phosphor crystals lighting device, that is connected to wiring 436 at a first end 440 of the wiring 436. The wiring 436 is disposed through a bore 444 formed in each of the third and fourth layers 416, 420 of composite material so that a second end 448 of the wiring 436 may be connected to a power source located externally to the body 404 of the vehicle component 400. The bore 444 may be formed prior to laying down the third and fourth layers 416, 420 of composite material during the assembly phase 104, or may be formed after the third and fourth layers 416, 420 are added to the second layer 412 during the assembly phase 104. Moreover, if desired, the wires of the wiring 436 may terminate at a connection element, such as an electrical connector (not shown in FIG. 5), which may be disposed in or mounted to the layer 420. This connection element may accept a further electrical connector (e.g., a male or female electrical connector) that electrically connects to a power source or a control circuit (also not shown in FIG. 5) for energizing and controlling the operation of the light source 432.

By manipulating the shapes of the design recess and/or lens, chipboards, lighting features, and sensors may be incorporated into vehicle body components without being limited to the shape of the vehicle component. For example, in FIG. 6 an exemplary vehicle component 500 is illustrated during the manufacturing process as being disposed on a contoured mold 504 with an integrated chipboard, lighting feature, or sensor. The vehicle component 500 is shaped to match the contours of the mold 504 and includes first 508, second 512, third 516, and fourth 520 layers of composite material (e.g., pre-impregnated sheets of carbon fiber weave), a lens 524, a lighting material 528, and electrical wiring 532 connecting to the lighting material or light source 528 and disposed through a bore 536 formed in the third and fourth layers 516, 520. The lens 524 may be formed to provide a curved exterior side 540 having an outer edge 544 that flares outwardly from the exterior side 540 rather than extend perpendicularly. A design recess, such as a void 548, is formed in the first and second layers 508, 512 to account for the curvature of the mold 504.

In some cases, the vehicle body components may be made with integrated electronic components in such a manner that the electronic light sources, sensors, chipboard etc., can be adapted, changed, or fixed without replacing the entire vehicle body component. In the examples illustrated in FIGS. 7-10 a removable lighting device may be incorporated in a vehicle body component so that a lighting material or light source may be removed and replaced without discarding the entire vehicle body component. Turning first to FIGS. 7 and 8, a vehicle component 600 may be manufactured to include a removable lighting device 604 (or a removable chipboard or sensor) allowing a lighting material or light source 608 (or a chipboard or sensor) to be removed from an interior side 612 of a vehicle body component 616. In this case, the vehicle body component 616 includes first 620, second 624, third 628, and fourth 632 layers of composite material, such as carbon fiber weave, and includes an outer resin layer 634. The lighting device 604 includes the light source 608, which in this case is illustrated as an LED, a lens 635, and a backing 636 which is made out of portions of one or more layers of the composite material (e.g., sheets of resin infused carbon fiber weave). The lighting device 604 also includes electrical wiring 640 that traverses through a bore 644 formed in the backing 636.

Generally speaking, the vehicle body component 600 may be manufactured according to the method 100 with one or more additional steps of forming portions of the lighting device 604 after the curing step 170. For example, the backing 636 may be formed of a portion of the third 628 and fourth 632 layers of the body 616 that is bonded to the a back portion of the lighting material or light source 608. In particular, the backing 636 may be formed by cutting a hole into the layers 632 and 628 around the lighting material 608 from a back side 648 of the fourth layer 632 to a top side 650 of the third layer 628. The backing 636 may be sized according to a circumference of the lighting material 608 such that a minimal amount of the body 616 is cut to form the lighting device 604. Moreover, the hole that is cut into the layers 632, 628 is preferably sized to be slightly larger (e.g., in circumference) than the light source 608 but preferably smaller than the width (circumference) of the lens 635 to allow the backing 636 (and the light source 608 attached thereto) to be removed from the void formed by the lens 635. As depicted in FIG. 8, the backing 636 and the light source 608 may be removed from the lens 635 and the light source 608 (or sensor in the case that a sensor is used as the electronic component, or a chipboard and attached electronic devices in the case that a chipboard is used as the electronic component) may be replaced. In some cases, the light source, chipboard, or sensor 608 may be replaced if it is broken. In other cases, a new or different light source, chipboard, or sensor 608 may be inserted into the component 604 to change the look, design, and/or functionality of the electronic component. In another case, the functionality of the chipboard may be changed or reprogrammed by updating or loading new software thereto.

FIG. 9 illustrates yet another example of a vehicle component 700 including a removable lighting device 704 that is manufactured by separately forming the removable lighting device 704 during the assembly phase 104, for example, of the method 100. A vehicle body component 708 is made of first 712, second 716, third 720, and fourth 724 layers of pre-impregnated composite material with a lens 735 disposed therein and having an out resin layer 734 after being cured. The lens 735 accepts a removable lighting device 704 therein. The removable lighting device 704 is separated from the layers 724, 720, 716, 712 and the lens 735 by a spacer 728, which may be a cylindrical casing disposed around a lighting material 732 when the lighting material 732 is placed inside of a design recess 736 during the manufacturing process. A lighting material backing 740 may be formed by placing a fifth 744 and sixth 748 layer of pre-impregnated composite material on to a back side 752 of the lighting material 732 and within an enclosed space 756 defined by the spacer 728. The spacer 728 permits a user to access the lighting material 732 from an interior side 760 of the vehicle body component 700 and remove the lighting material 732 from the body 708 of the component 700 after curing and without performing additional cutting steps. In particular, the spacer 728 is configured to isolate the lighting material 732 and the lighting material backing 740 from the first 712, second 716, third 720, and fourth 724 layers of the body 708. Specifically during curing, the resin of the pre-impregnated composite material fuses to connect with the surrounding layers of pre-impregnated composite material, and the spacer 728 provides a barrier to that bonding step between the lighting material backing 740 and the other layers of the body 708. Moreover, the use of the spacer 728 enables the removable electronic component 704 to be formed and cured with the rest of the vehicle body component 700, or separately therefrom.

Thus, as will be understood, the removable lighting devices 604, 704 of the vehicle components 600, 700 of FIGS. 7-9 allow the lighting material 608, 732 to be replaced or changed without replacing the entire vehicle component 600, 700. Each of the removable lighting devices 604, 704 may be accessed from the interior side 612, 760 of the vehicle component 600, 700 and the lighting material 608, 732 may be removed and replaced without altering the placement of lens, the smooth exterior surface of the component body, and the structural integrity of the vehicle component 600, 700.

The removable lighting devices 604, 704 also permits adding or changing a lens filter to change the visual effects of the lighting feature of the vehicle component. As illustrated in FIG. 10, a filter 800 is disposed on a back surface 804 of an exterior side 808 of a lens 812. The filter 800 may be configured to change the color of an otherwise transparent lens 812 and/or may include a design, an image, or some other artistic rendering. For example, the filter 800 may include a blue half 816 and a red half 820 such that when a white LED light 824, for example, is energized, the lighting feature displays a particular design with blue and red features. As discussed previously with reference to FIG. 1, lighting and other electronic components 14 of vehicle body components may display various shapes, like an arrow 52 or a collection of circles 54, in addition to applying filters to customize the overall appearance of a vehicle.

Figure 11:
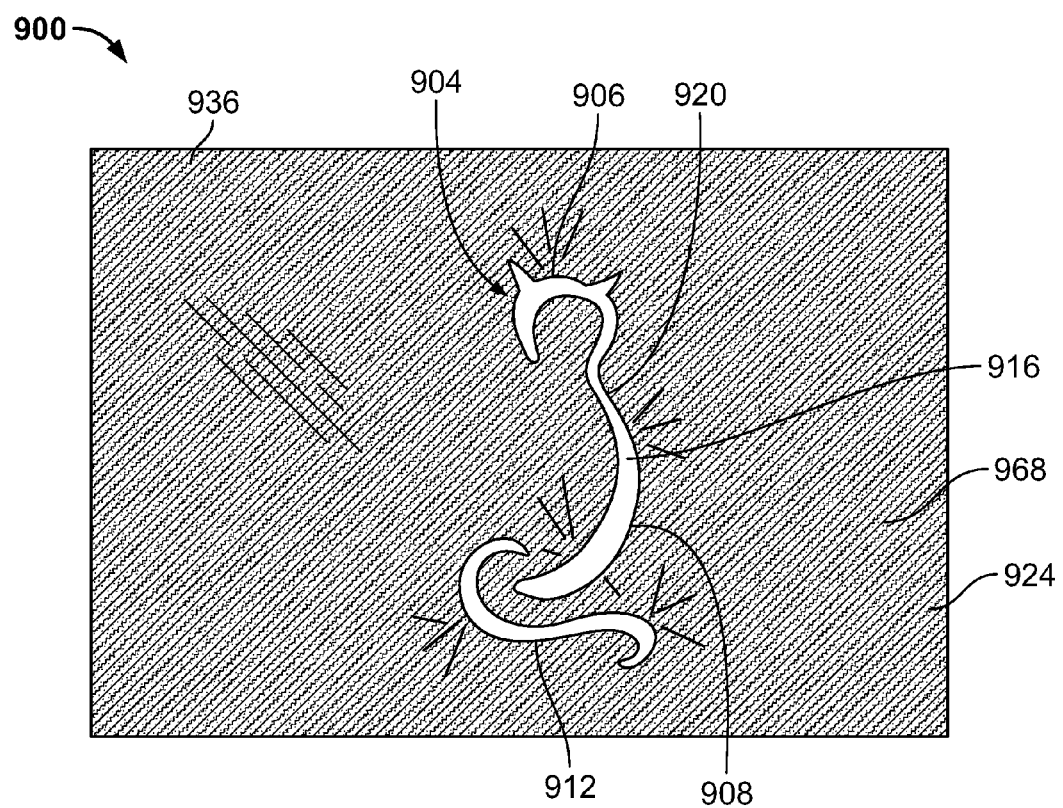
FIG. 11 is a front partial view of an example of a finished vehicle body component with an integrated electronic lighting component.
Figure 12:
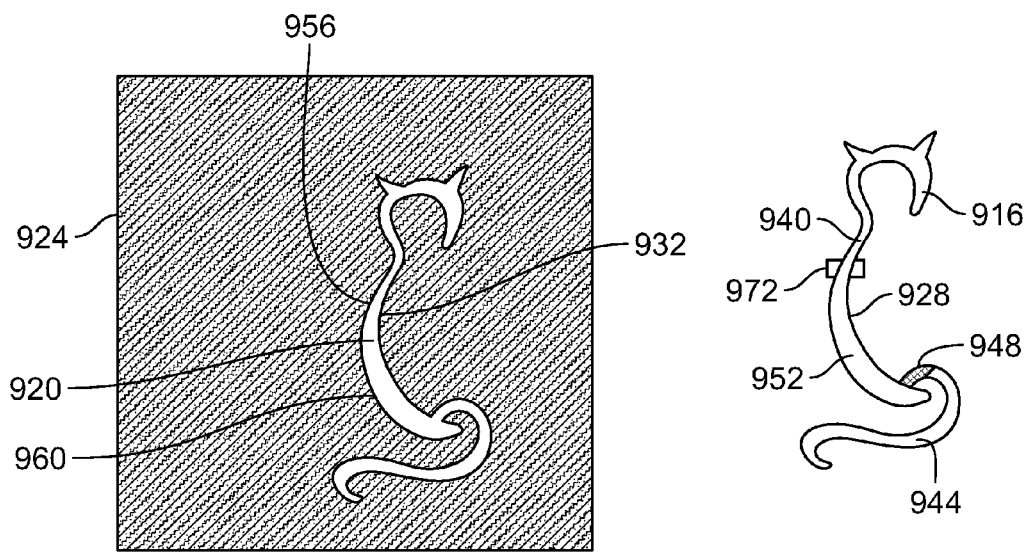
FIG. 12 illustrates a top view of a layer of pre-impregnated composite material and a lens design to be disposed in the pre-impregnated composite material.
Figure 13:
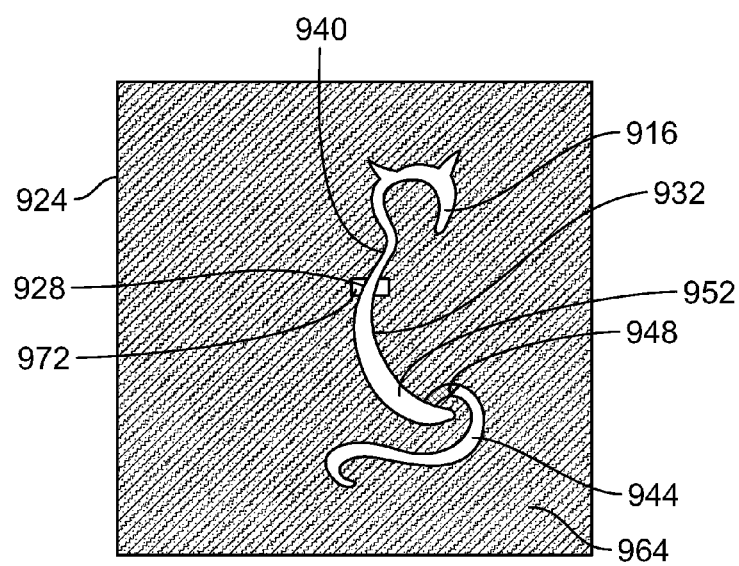
FIG. 13 illustrates the lens disposed within the layer of pre-impregnated composite material of FIG. 12.

According to the techniques disclosed herein, any desired design shape may be formed in the body of the vehicle component during manufacturing, i.e., by forming a design recess in one or more (for example, first and second) layers of a layered assembly, and by placing a lens shaped to match the design shape of the cavity within the recess and by then placing an electronic component into the recess or the lens. The design shape of a lighting feature may be more complex and may include a combination of different lighting effects to accomplish a desired visual design and display. FIG. 11 illustrates a carbon fiber vehicle component 900 having an integrated lighting feature 904 in the shape of a cat that may be manufactured according to the methods or processes described herein. A body 936 of the component 900 is made of a composite material, such as carbon fiber weave, and the cross-hatching is used to illustrate how the lighting feature stands out against the composite material when illuminated by the lighting material. In the case shown in FIG. 11, the body of the vehicle component 936 is formed using pre-impregnated carbon fiber, which leaves a smooth, black, finished exterior surface. FIGS. 12 and 13 are included to illustrate two different stages of an assembly phase of the manufacturing process to reach the finished lighting feature in FIG. 11.

In FIG. 11, the vehicle body component 900 has an integrated lighting feature 904 in a design shape 906 of a cat, having a head and body part 908 and a tail part 912. When a lighting material of the lighting feature 904 is powered, light emits through a lens 916 so that the illuminated head and body part 908 appears to be separate from the illuminated tail part 912 of the cat design 906. The head and body part 908 and the tail part 912 may be illuminated with a single lighting material or light source disposed within a design recess 920, such as a void, or the tail part 912 and the head and body part 908 may be illuminated with different lighting materials or light sources. Although the visual effect of the illuminated cat design 906 in FIG. 11 suggests that the head and body part 908 is separately lit from the tail part 912 of the cat design 906, FIG. 12 illustrates that this visual effect may be achieved by etching the lens 916 to alter the opacity and therefore the manner in which the lens 916 diffuses the emitted light of the lighting material or light source. In FIG. 12, the lens 916 is located to the right side of a layer 924 (or stacked layers) of pre-impregnated carbon fiber with a design recess 920 shaped to receive the lens 916. FIG. 13 illustrates the lens 916 disposed within the design recess 920 prior to inserting a lighting material into to the design recess 920 and behind the lens 916. The lens 916 is a single piece having a head and body portion 940, a tail portion 944, a connecting portion 948, and an outer edge 928 defining an outline of the design shape 906 and the head and body, tail, and connecting portions 940, 944, 948. The outer edge 928 of the lens 916 corresponds with a design wall 932 of the design recess 920 formed in the layer(s) 924 of pre-impregnated carbon fiber, and the outer edge 928 is configured to engage the design wall 932 of the carbon fiber material. The connecting portion 948 of the lens 916 is disposed between the head and body portion 940 and the tail portion 944 and is shaded to represent etching, which alters the opacity of the lens 916 and therefore the overall display of the lighting feature 904. The etching of the connecting portion 948 effectively blocks light of the lighting material from passing through the connecting portion 948 of the lens 916, as shown in FIG. 11, giving the visual effect that the head and body part 916 and tail part 912 are separate lighting features. Alternatively, a filter may be disposed at the connecting portion 948 on an inside surface 952 of the lens to block light from passing through the lens 916 at the location of the connecting portion 948. The filter may also transmit different colors, different light intensities, etc. at different locations of the lens 916 to provide varying visual effects.

The design recess 920 in this example is a void and is formed by removing a portion of each of a number of layers 924 in the shape of the design 906, thereby forming a void 956 in each of layers 924. Each void 956 includes an outer edge 960 that forms the design wall 932 of the design recess 920 when aligned with an outer edge 960 of an adjacent layer 924. As shown in FIGS. 11-13, the outer edge 928 of the lens 916 engages the design wall 932 of the design recess 920 so that there are preferably no gaps between the lens 916 and the body 936 of the vehicle component 900. The lens 916 may be a flat piece of polycarbonate or acrylic material, and may include a lip portion 972 or a tab to secure the lens 916 between two (such as between second and third) layers of composite material, forming the body 936 of the vehicle component 900. While only one layer 924 is illustrated in the FIGS. 12 and 13, a back side 964 of a second layer 924 is shown in FIG. 13, and a top side 968 of a first layer 924 is shown in FIG. 11.

Figure 14A:
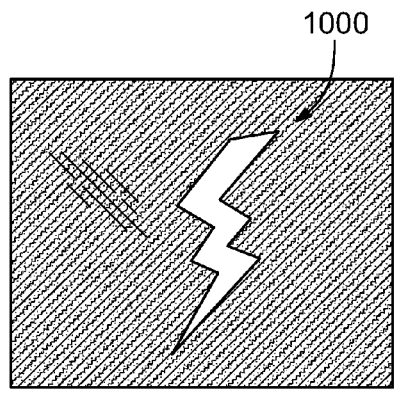
FIGS. 14A-14F illustrate partial views of different examples of finished vehicle body components with various integrated lighting components.
Figure 14B:
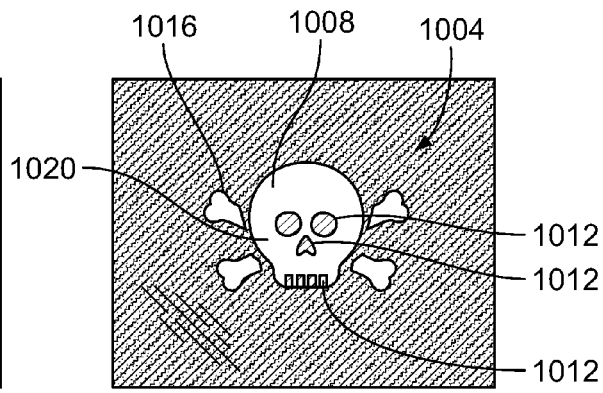
Figure 14C:
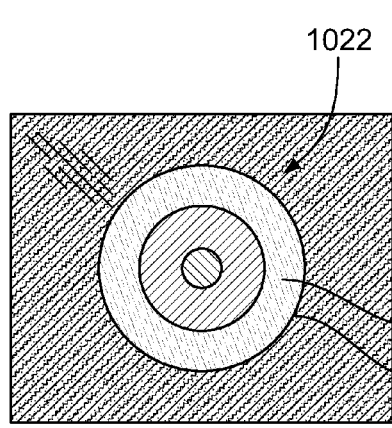
Figure 14D:
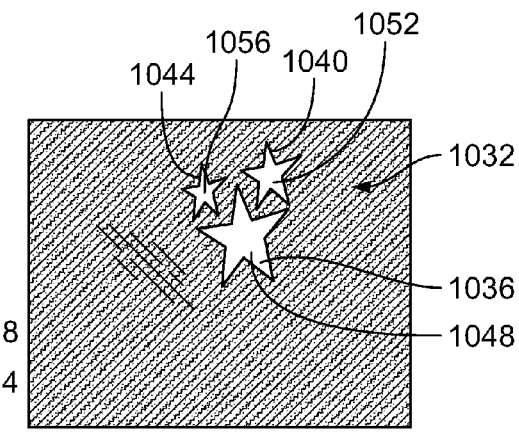
Figure 14E:
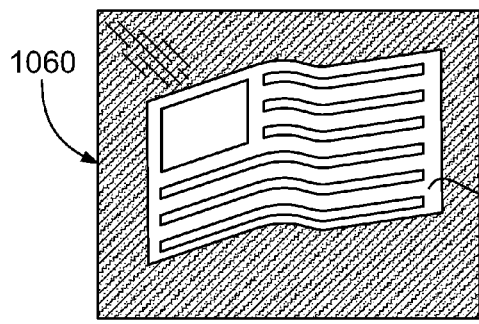
Figure 14F:
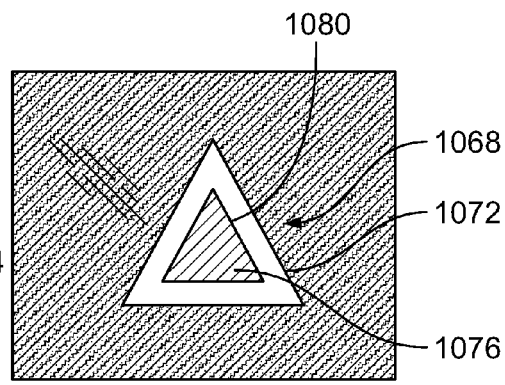

Etching, as discussed above, can alter the opacity of a lens, and therefore may be used as a technique to affect the diffusion of the light through the lens of a lighted electronic component. Etching may also be used to provide a three-dimensional design effect, provide variations in shading of the display, and provide small details in the design without changing the outline of the design shape. As illustrated in FIGS. 14A-14F, a combination of etching, filters, and design shapes create lighting features with varying visual effects. FIG. 14A has a lighting feature 1000 in the shape of a two-dimensional lightning bolt design. FIG. 14B illustrates a lighting feature 1004 having a skull and cross-bones design. A lens 1008 may include etching to prevent light from passing through portions 1012 of the lens 1008, providing a visual effect of the dark orifices of a skull part 1020. The lens 1008 may also include etching to achieve a three-dimensional image where a cross-bones part 1016 of the design appears behind the skull part 1020 of the design. Alternatively, the cross-bones part 1016 may be achieved by creating a design recess and lens for each shape of the cross-bones 1016 and for the skull 1020. The lighting feature 1022 of FIG. 14C includes an outer circular design recess 1024 and a filter 1028 having three concentric circles of different colors disposed on or within the lens, permitting a user to display a target with different filter colors. A vehicle component of FIG. 14D includes a lighting feature 1032 that may be manufactured with a first 1036, second 1040, and third star-shaped design recesses 1044, and with first 1048, second 1052, and third lenses 1056 inserted in the corresponding recesses. A lighting material may be located in each design recess, and each lighting material may be a different color to display three stars of different sizes and different colors. FIG. 14E includes a lighting feature 1060 of a flag with detail created by etching a lens 1064 in an outline of each shape disposed within the flag. Alternatively, a filter may be placed within the lens 1064 that blocks portions of the lens 1064 to create the flag details. Finally, FIG. 14F depicts a lighting feature 1068 with a first triangle 1072 and a second smaller triangle 1076 appearing to float in front of the first triangle 1072. The floating effect may be achieved by using a filter and/or etching a portion of a lens 1080 to block light from passing through the second triangle 1076.

In addition to the various visual effects that may be created by the techniques described above, the lighting material used to create the desired lighting feature may vary, as well. For example, the lighting materials may include electroluminescent tape, phosphor crystals, light emitting diodes (LEDs), organic light emitting diodes (OLEDs), fiberglass tubing, solar panels, photovoltaic cells or arrays, neon or other gas filled lights, or other lighting material that may be installed. The intensity and color of light emitted by the lighting material can vary based on the method of manufacture of the lighting material, types of lights therein, and frequency and/or amplitude of an alternating voltage or direct current voltage that may be applied to the wires, etc., or any combination thereof. The wiring of the lighting material may be connected to a controller and/or into an electrical system of the vehicle to allow a user to turn on/off or to select particular control systems, such as turn signaling or engine or vehicle speed, to be used to modulate the energization of the lighting materials. The level of illumination of the lighting material may be configured to change based on the vehicle control system, for example turn signaling or vehicle or engine speed indicators.

Figure 15:
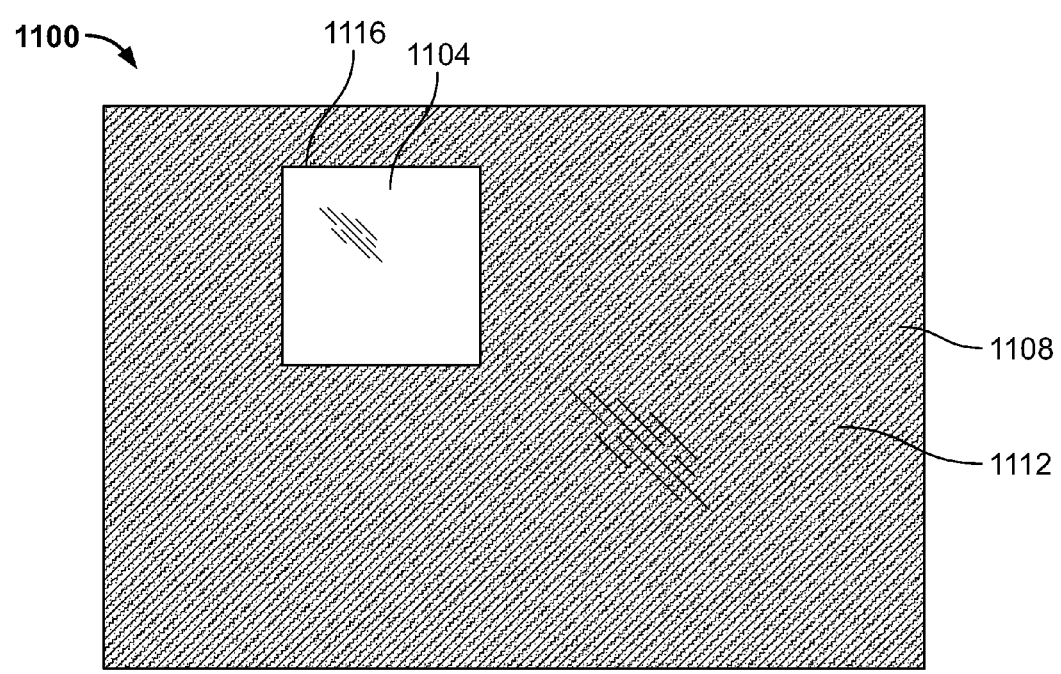
FIG. 15 is a front view of an example of a finished vehicle body component having another integrated electronic lighting component in the form of an electronic display disposed therein.

Turning to FIG. 15, a vehicle component 1100 may be made according to the method or process described herein to provide a component with an integrated LCD screen 1104 or a chip board with a device having a touch screen. Rather than emit a stationary image, the LCD screen 1104 or touch screen would allow the vehicle component 1100 to display a motion picture or allow user-interaction with the touch screen. The vehicle component 1100 includes a layered composite body 1108 having a smooth exterior surface 1112 and a design recess 1116 formed in, for example, first and second layers of the body 1108. The LCD screen 1104 may be inserted into the design recess 1116 and may be encased within an additional set of one or more layers of composite material added to a backside of the LCD screen 1104. In a similar manner, a vehicle component 1100 may be manufactured to incorporate one or more sensors used for security, controlling certain functions of a vehicle, and/or aiding a user while driving the vehicle. Various types of sensors may be integrated into a vehicle component, for example, acoustic sensors, temperature sensors, navigation instruments, photoelectric sensors, alarm sensors, motion detectors, and personal-identity sensors.

Figure 16:
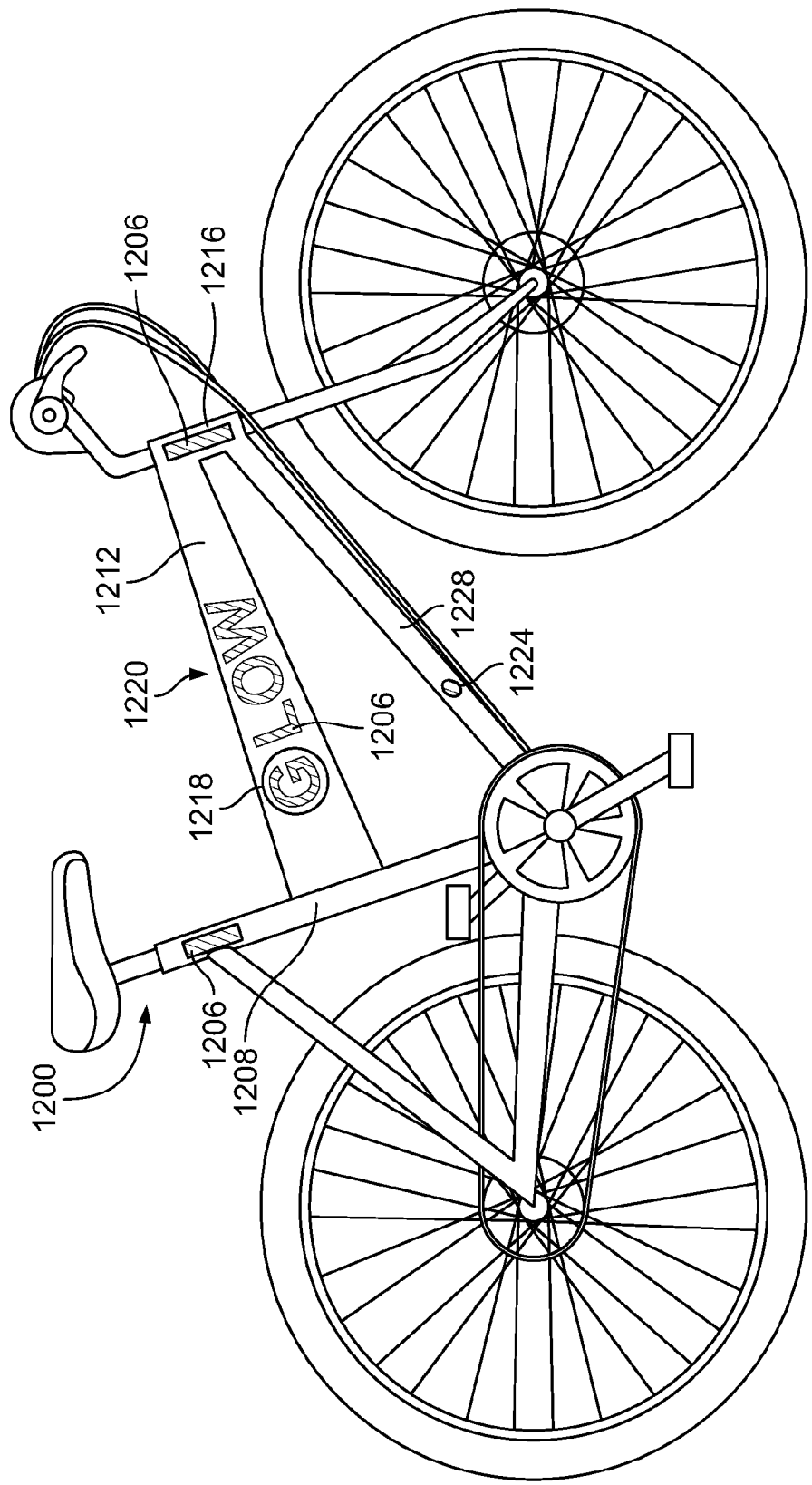
FIG. 16 illustrates an example bike frame with integrated electronic lighting components.

Of course, while the integrated electronic components of a vehicle body have been described herein as being used on automobile body components, these integrated electronic components could be used on or with other types of vehicles as well or instead. For example, in yet another example of a vehicle component, FIG. 16 illustrates a customized composite bicycle frame 1200 with lighting features 1204, 1206 integrated into different bicycle frame components, such as a seat tube 1208, a top tube 1212, and a head tube 1216. The example frame 1200 is made of a composite material, such as carbon fiber, fiberglass, etc., and provides both functional and artistic integrated lighting features 1204, 1206. For example, the seat tube 1208 and the head tube 1216 include integrated lighting features 1206 disposed on a right side and a left side of the bicycle frame 1200 to provide a turn signal, to indicate braking, or to illuminate a surrounding environment, such as a head lamp or a rear light. The top tube 1212 includes an example of an integrated lighting feature 1206 that displays an illuminated logo 1218 and lettering 1220, which may indicate a brand, name, team, or slogan. Furthermore, the bicycle frame may include an integrated sensing mechanism 1224 in a down tube 1228 of the frame 1200, for example a photoelectric sensor that is configured to illuminate one or more of the lighting features 1204, 1206 when the bicycle is in a dark environment.

The bicycle frame 1200 may be manufactured according to the method 100 described herein as a single frame 1200, or each frame component may be manufactured separately. For example, each component may include a composite body with first, second, third, and fourth layers of composite material (but which could include more or less layers), a lens, a lighting material disposed in one or more recesses formed in various ones of the layers of the body 1200, and electrical wiring connecting the chipboard, lighting material, and the sensor 1224 to an external power source. The lettering 1220 may be formed, for example, by forming a design recess in a shape of each letter, and the coloring of the lettering 1220 may be altered using colored filters, colored lighting material, and etching on the lenses. As shown in previous examples of vehicle components, the wiring may be embedded within the body 1200 of the vehicle body component, for example, between second and third layers of composite material, between third and fourth layers of composite material, or traversed through the third and fourth layers of the body to an inside surface of the component. The lighting features 1204 may be connected to a controller so that a user may indicate a turning direction and/or to illuminate other lighting material so that the bike frame 1200 is illuminated when the user is riding in the dark or at other times. The lighting features 1204, 1206 are electrically connected to a power source, such as a battery, disposed on the interior surface of the bicycle frame 1200, and may be configured to connect to one of the mechanical systems of the bicycle, such as the braking system to illuminate the lighting features 1204, 1206 automatically when the user applies the brakes.

The body of the vehicle components described herein may be made of different pre-impregnated composite materials, such as, carbon fiber, Kevlar, and fiberglass. Typically, pre-impregnated carbon fiber may come in the form of carbon fiber sheets that are pre-treated and reinforced with resin, such as epoxy. As previously discussed, under heat and/or pressure treatment, the epoxy is drawn to an interior side of the mold and forms a uniformly distributed clear protective layer over the exterior surface of the entire component. If a certain design effect requires a large design recess to be formed in the first and second layers, an additional layer of resin may be added in the assembly phase so that the entire component has an even exterior surface. Fiberglass and carbon fiber weave may be dyed to change the color of the vehicle component body, and fiberglass may be treated to be translucent. In a preferred vehicle component, the pre-impregnated composite material is a pre-impregnated carbon fiber having a 70% carbon fiber and 30% epoxy composition. In another embodiment, the vehicle components with integrated electronic components may be manufactured by high pressure resin transfer molding.

Chipboards, lighting materials, sensors, LCD screens, and other similar devices generally require an energization mechanism that energize the materials from an external power source to cause the material to emit light and/or function. Dual conductors are illustrated as the wiring in the multiple examples illustrated herein and are disposed between and through different layers of composite material of the body of the vehicle component. The wiring provides a supply and return electrical energy (voltage and/or current) for energizing the chipboard, lighting materials, and/or sensors. A voltage can be applied between or across dual conductors from the vehicle power system by wires to provide a means for energizing the chipboard, lighting materials, and/or sensors integrated into the body of the component. When a voltage is applied between the supply and return wires, the chipboard may transmit signals, the lighting material may emit light, and the sensors may be activated. The power source may be the vehicle electrical system, as discussed above, a battery of the vehicle, a battery disposed within a compartment attached to an inside surface of the component body, or by non-electrical means, for example, when a vehicle door opens. Furthermore, a sensor may be configured to electrically connect a lighting material also integrated within a vehicle component by communicating with a chipboard.

Figure 17:
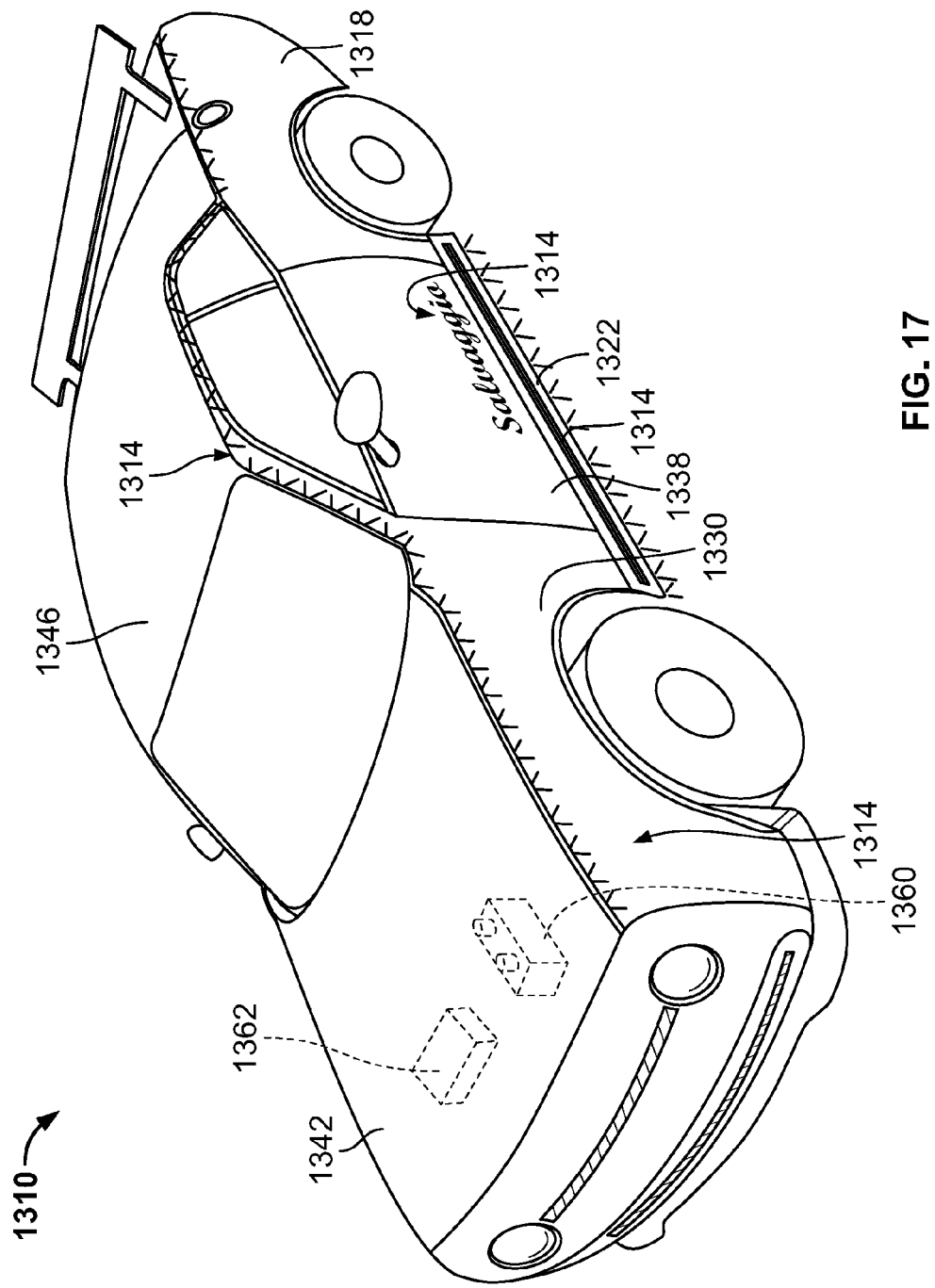
FIG. 17 illustrates an example vehicle body with integrated tubular lighting components disposed within various ones of vehicle body components of the vehicle body.

In FIG. 17, a different customized vehicle body 1310 with integrated lighting features 1314 is illustrated. The lighting features 1314 may display a particular design and/or provide a certain function to the vehicle body 1310 by incorporating tubular lighting technology built into, or integrated with, one or more body components of the vehicle body 1310. The tubular lighting features 1314, as compared to the lighting features 16 of FIG. 1A, may provide a continuous, illuminated line design without requiring a filter to create the desired styling, image, illuminated logo, and/or lettering. The lighting feature 1314 itself can be used for designs that require continuous shapes and precision. The tubular lighting component or feature 1314 may be, for example, a glass fiber optic lighting guide disclosed in U.S. Pat. No. 9,329,318, entitled "Side Emitting Glass Element," the entire contents of which are incorporated herein by reference.

In one example, a lighting feature 1314 integrated with a rocker 1322 may be energized to provide a constant linear light beam to illuminate an area underneath the car body 1310. In another example, a lighting feature 1314 of a car door 1338 can display a name "Salvaggio" in cursive writing with precision that can match a personalized signature. In another example, the lighting features 1314 of a front fender 1330 provide multiple, continuous lines with varying thickness. In yet another example, one lighting feature 1314 may be integrated with a front fender 1330, car door 1338, roof 1346, and back fender 1318 to provide a continuous, linear detail that may illuminate the outline of a top portion of the vehicle body 1310. As illustrated in the vehicle body 1310 of FIG. 17, the lighting features 1314 may be used to create a range of lighting shapes and effects. Additionally, the lighting features 1314 may provide a range of different colored designs.

The tubular lighting components 1314 of FIG. 17 may be integrated into the vehicle body 1310 made of, for example, a composite material so that each vehicle body component has a smooth exterior surface. The lighting material 1314 may be incorporated into a vehicle body component in the same or similar manner as previously discussed and with reference to the integrated electronic components of FIGS. 1-16. Alternatively, the light source of the tubular lighting components 1314 may be attached to an open end of a tube after the vehicle component is manufactured. The light source would electrically connect to a power source hidden from view, such as a battery 1316 or electrical circuits 1362 of an electrical system of the vehicle, and this power source may or may not be integrated within the carbon fiber layers.

Figure 18:
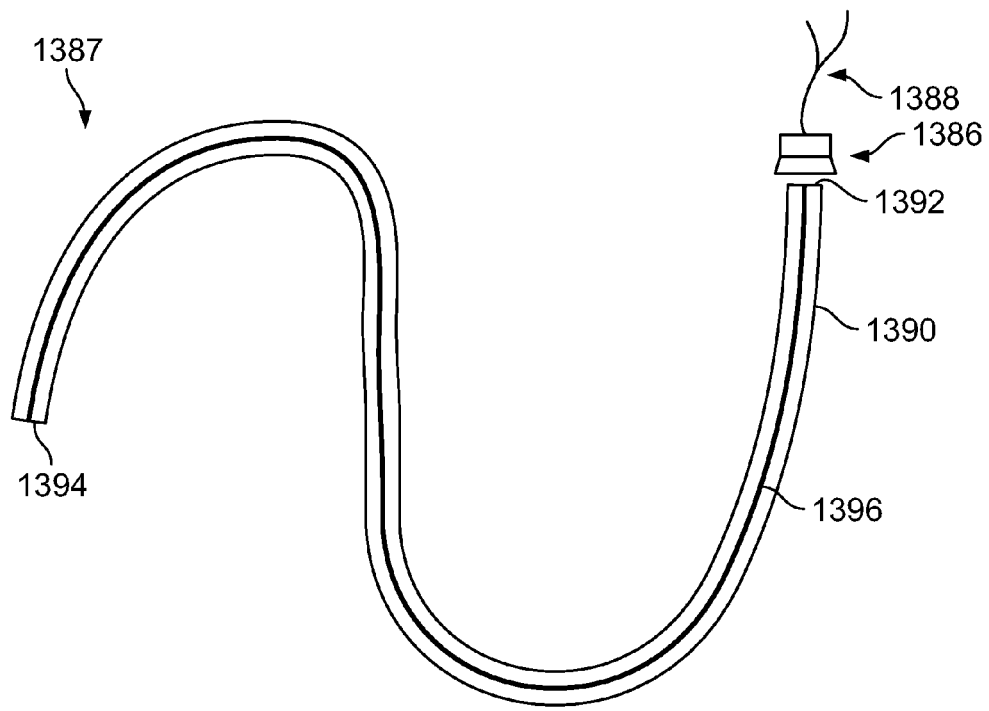
FIG. 18 illustrates an example arrangement of a tubular lighting component.

FIG. 18 illustrates an example tubular lighting component 1387 that may be incorporated into the vehicle body 1310 of FIG. 17. The tubular lighting component 1387 includes a glass rod 1390 or tube having a first end 1392, a second end 1394, and a light guide 1396 disposed within the tube 1390. The light guide 1396 may include one or more flexible filaments, e.g. optical fibers, that extend between the first and second ends 1392 and 1394 of the tube 1390, and that can carry, distribute, and/or reflect light waves from end to end. The tubular lighting component 1387 in FIG. 18 is shaped in a double curve configuration, which may be formed by heat-treating the glass tube 1390. A light source 1386, which may be any lighting material described herein such as, for example, an LED light, is disposed adjacent to the first end 1392, also referred to as an "open end," of the tube 1390 and directs light through the light guide 1396. Opposite the light source 1386, the second end 1394 of the tube 1390, also referred to as a "closed end" or "end wall" of the tube 1390, effectively acts as an end point of the light distributed by the light guide 1396. The closed end 1394 reflects the light transmitted from the light guide 1396 back through the tube 1390 to create a solid, illuminated line. The end wall 1394 provides a barrier to the light waves carried by the 1396 so that the light does not dissipate through the tube 1390. So configured, when the light source 1386 is energized, light waves of the light source 1386 may travel through the open end 1392 of the tube 1390 and through the flexible filaments of the light guide 1396. The filaments of the light guide 1396 reflect the light waves through the glass medium of the tube 1390 and illuminate the double curve lighting design. In this manner, light emits from the edges of the light guide 1396 to thereby illuminate a pattern in the shape of the light guide 1396 as disposed in the composite material. The composite material may provide a dark contrasting background against the light emitting from the edges of the light guide 1396.

Figure 19:
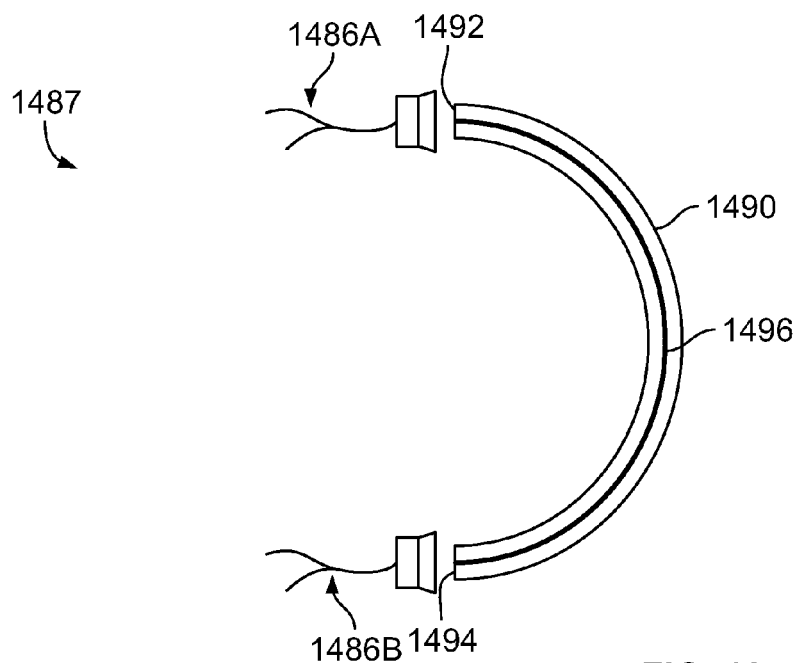
FIG. 19 illustrates a different example arrangement of a tubular lighting component.

In another configuration shown in FIG. 19, a tubular lighting component 1487 includes a tube 1490 shaped in a semi-circle with a light source 1486A and 1486B at each end 1492 and 1494. In this case, the first and second ends 1492 and 1494 of the tube 1490 are both open such that the light sources 1486A and 1486B may direct light through the light guide 1496 disposed in the tube 1490. Each light 1486A and 1486B may be a different color to provide a certain visual affect. When illuminated, light emits from the edges of the light guide 1496.

The tubes 1390 and 1490 of the tubular lighting components 1387 and 1487 of FIGS. 18 and 19 may be made of glass or plastic, and each tube 1390 and 1490 contains a light guide 1396 and 1496 including one or more bundled filaments. The filaments may be gas, glass, plastic, fiber, or other suitable material for transmitting and reflecting light through the surrounding medium of the tube 1390 and 1490.

The brightness of the lighting component 1387 and 1487 may be changed based on certain material properties for each of the tube 1390 and 1490 and light guides 1396 and 1496. For example, a constant illumination may be provided when a refractive index of the light guide material is greater than a refractive index of the tube material. Additionally, the brilliance or brightness of the illuminated line created by the tubular lighting component 1387 and 1487 may be elected based on a ratio of a diameter of the light guide 1396 and 1496 relative to a diameter of the tube 1390 and 1490. For example, the diameter of the tube 1390 and 1490 may be approximately 2.2 mm and up to 3.65 mm. In a preferred embodiment, the tube 1390 and 1490 is glass or other suitable material that binds to the resin and/or the composite material layer.

Figure 20A:
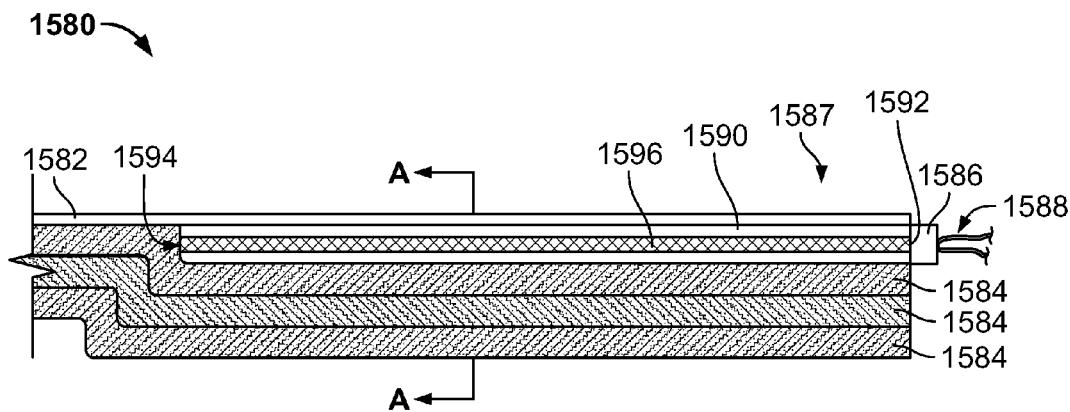
FIG. 20A illustrates a partial cross-sectional view of a vehicle body component with one of the tubular lighting components of FIG. 17 integrated with the vehicle body component.
Figure 20B:
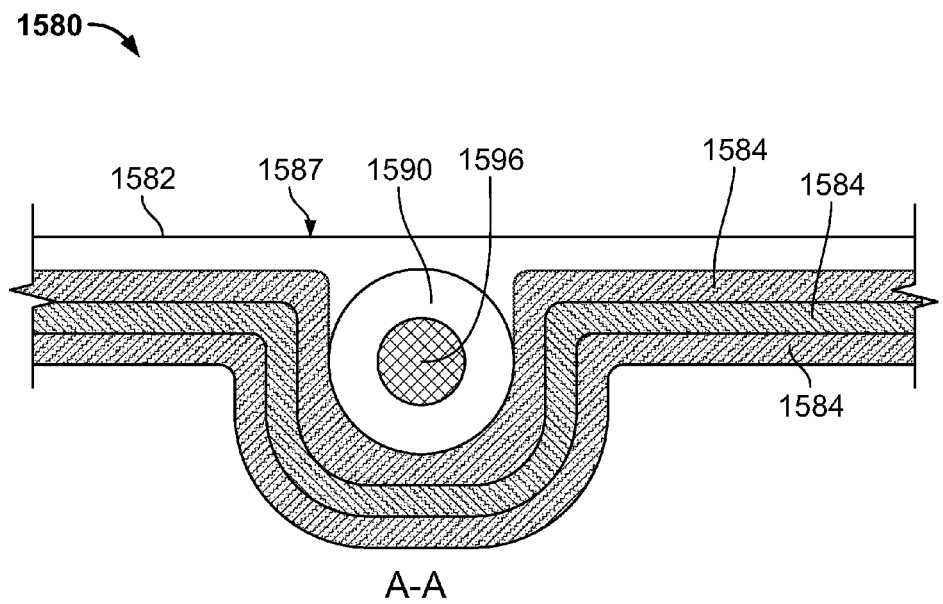
FIG. 20B illustrates a cross-sectional view of the vehicle body component with the integrated tubular lighting component taken at A-A of FIG. 20A.

FIGS. 20A and 20B illustrate a cross-sectional view of a vehicle body component 1580 having an integrated tubular lighting component 1587, such as, for example, one of the tubular lighting components 1314 of FIG. 17. As illustrated in FIGS. 20A and 20B, the integrated tubular lighting component 1587 may display an artistic design at an exterior (in this case at the top edge as depicted in FIGS. 20A and 20B) of the component 1580 when the lighting component 1587 is illuminated. The integrated vehicle component 1580 has an exterior cured layer of resin 1582 formed over the tubular lighting component 1587 and three layers or sheets 1584 of woven fiber weave, such as carbon fiber. As will be understood, the resin layer 1582 is made of resin that, when baked under heat and/or pressure during the curing process, flows from pre-impregnated sheets of carbon fiber 1584 to form the outer layer of the component 1580. More particularly, the resin layer 1582 forms a smooth outer surface of the component 1580 with no seams, gaps, or creases therein. The tubular lighting component 1587, such as one of the type of tubular lighting components 1387 and 1487 previously described with reference to FIGS. 18 and 19, is integrated between the resin layer 1582 and one of the carbon fiber sheets 1584. In this case, the tubular lighting component 1587 is in the form of a simple linear tube 1590, a light guide 1596 centrally disposed within the tube 1590, and an adjacent light source 1586. As illustrated in FIGS. 20A and 20B, the tubular lighting component 1587 may be disposed in a design recess, which may be a non-flat structure, such as a groove or indentation, either pre-formed in one or more of the carbon fiber layers 1584 prior to curing, or formed when the carbon fiber sheets 1584 mold to the shape of the tube 1590 during curing.

As depicted in FIG. 20A, the light source 1586, which may be an LED, an incandescent light, a CFL light bulb, a neon light bulb, a florescent light bulb, etc., is disposed adjacent to a first end 1592 of the tube 1590. When the light source 1586 is energized, light waves created by the light source 1586 propagate through the light guide 1596 to illuminate a thin line extending the length of the tube 1590. The light emitted by the tube 1590 may exit from the component 1580 through the resin layer 1582 so that the light may be visible from the exterior of the component 1580. In the illustrated example, the light source 1586 is disposed outside of the carbon fiber sheets 1584, and may be connected to the open end 1592 of the tube 1590. A second end 1594 of the tube 1590 is adjacent to a layer of carbon fiber 1584 so that the second end 1594 of the tube 1590 reflects the light back through the light guide 1596. While the illustrated example depicts the light source 1586 disposed outside of the integrated component 1580, in other cases, the light source 1586 may be integrated with the tube 1590 of the lighting component 1587 and/or integrated between the layers of resin 1582 and/or carbon fiber sheets 1584, such as the integrated lighting materials previously described. Similarly, a set of wires or other electronic energization leads 1588 connect the light source 1586 to a source of energization (not shown in FIGS. 20A and 20B) and may be disposed outside of the carbon fiber layers 1584, or may be fed through or disposed between two of the carbon fiber layers or sheets 1584 and may, at some point, exit from the component 1580 such as from the back of the component 1580. The leads 1588 may be two or more leads depending on the type of light source 1586.

Figure 21:
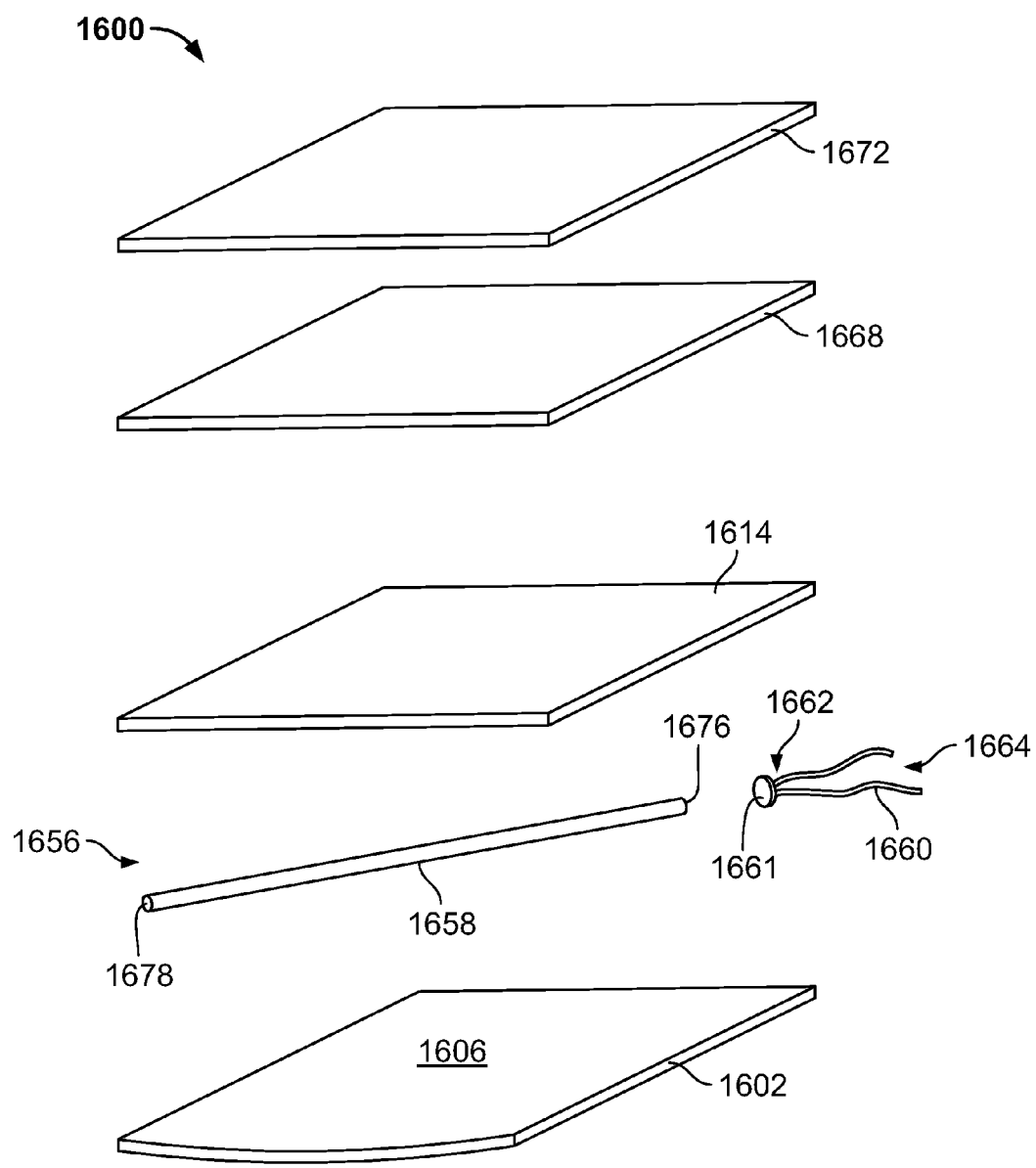
FIG. 21 illustrates an exploded view of one example of assembling a vehicle body component with a tubular lighting component therein.

FIG. 21 illustrates an exploded layered assembly 1600 of a vehicle body component 1600 with a tubular lighting detail provided by a tubular lighting component 1656. In this example, a mold 1602 of a vehicle component, which in this case is a hood of an automobile body, includes a contoured interior side 1606 and may be coated with a wax or non-stick coating so that the pre-impregnated composite material does not bond or stick to the mold 1602 during the curing step. The tubular lighting component 1656 includes a lighting tube 1658 and a light source 1661. The lighting tube 1658 may be the combined component of the tube 1390, 1490, 1590 and light guide 1396, 1496, and 1596 of any of the tubular lighting components 1387, 1487, and 1587 previously described with reference to FIGS. 18-20B. As such, the lighting tube 1658 may include a refractive medium, such as glass, surrounding one or more flexible filaments centrally disposed within the lighting tube 1658. The lighting tube 1658 may be disposed directly adjacent to the interior side 1606 of the mold 1602, and the light source 1661 may be positioned adjacent to an open end 1676 of the lighting tube 1658. In one assembly of the lighting component 1656, the light source 1661 may be connected to the lighting tube 1658 when the lighting component 1656 is added to the assembly 1600. In another example, the light source 1661 may be added to the component 1600 after the component assembly 1600 is cured, at which point the light source 1661 may be connected to the integrated lighting tube 1658. In any event, the light source 1661 is placed adjacent to the first end 1676 of the tube 1658. As illustrated in the example of FIG. 19, a second light source may be added to a second open end 1678 of the tube 1658. The light source 1661 provides wiring 1660 with a first end 1662 connected to the light source 1661 and a second end 1664 configured to connect the light source 1661 to a power source, such as a control circuit, battery, etc.

First, second, and third layers 1614, 1668, and 1672 of pre-impregnated composite material, such as pre-impregnated carbon fiber, may be added on top of the lighting tube 1658 where the first layer 1614 encloses the tube 1658 against the mold 1602. The composite material (carbon fiber weave) may be configured to flex, bend, and fold to permit each of the first, second, and third layers 1614, 1668, and 1672 to bend with each contour of the tubular rod 1658 and/or the contours of the mold 1602. Applying heat to the first, second, and third layers 1614, 1668, and 1672 may allow the layers to "give" easily and better form around the tube 1658, such as forming a design recess such as an indent or groove based on the shape of the tube 1658. The layers 1614, 1668, and 1672 provide a lighting material backing. Additional layers of pre-impregnated composite material may be added, and UV protection may be provided to finish the vehicle component.

Figure 22:
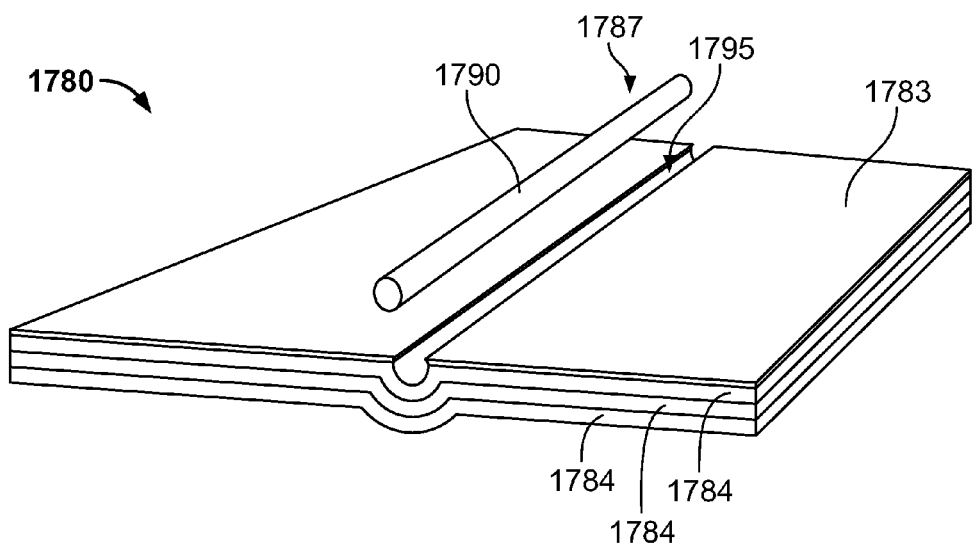
FIG. 22 illustrates a partially exploded view of a vehicle body component and a tubular lighting component.
Figure 23:
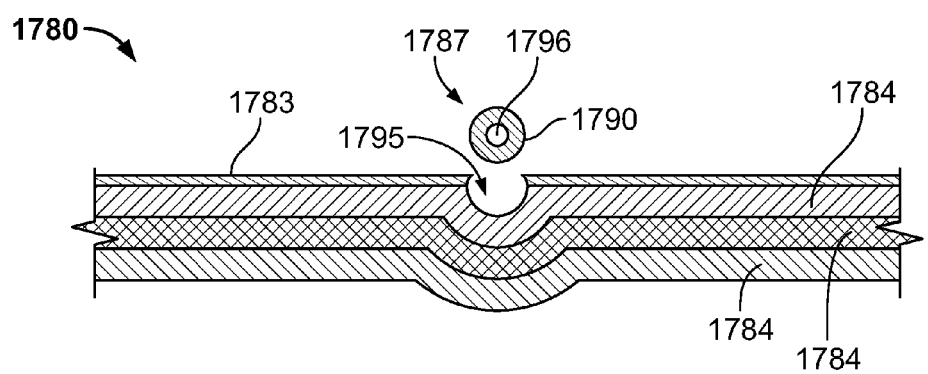
FIG. 23 illustrates a partial cross-sectional view of the vehicle body component and tubular lighting component of FIG. 22.

As discussed previously, a tubular lighting component 1787 may be added to the vehicle body component 1780 after the vehicle body component 1780 is assembled, shaped to a mold, and cured. For example, FIGS. 22 and 23 illustrate a tubular lighting component 1787 and a vehicle body component 1780 manufactured and formed to receive the tubular lighting component 1787. The vehicle body component 1780 includes a plurality of composite sheets 1784 molded together forming an integrated body. A design recess or groove 1795 is formed in an outer surface 1783 of the component 1780, and is shaped to receive a tube 1790 of the lighting component 1787. The groove 1795 is formed during manufacturing by a method of manufacturing that is similarly to the method previously described and shown in FIG. 2. However, instead of directly placing the lighting component 1787 onto the mold, a tubular spacer (not shown) is placed between the mold and the pre-impregnated composite sheets 1784. The spacer permits the composite sheets 1784 to mold around the shape of the spacer so that a groove 1795 is formed in the outer surface 1784 of the vehicle body 1780. After the assembly is cured, the spacer is removed, leaving the groove 1795 sized to receive the tubular lighting component 1787. The groove 1795 may be shaped to slidably receive the tube 1790 so that the lighting component slides in a parallel direction relative to the groove 1795 and fastened in place. The groove 1795 may also receive the lighting component 1787 by friction fit, where the lighting component 1787 is snapped into place by aligning the tubular lighting component 1787 with the groove and then pressing the tube 1790 downward into the groove 1795. Alternatively, the lighting component 1787 may be removably attached or fastened within the groove 1795 by fixing the tube 1790 to the groove 1795 with an adhesive.

In yet another embodiment, any number of sensors, processors, lights, and/or other electronic components may be mounted on or be integrated as part of a chip or a chip board integrated into a vehicle body component. The processors (which may be stand-alone components or which may be part of a chip set or chipboard) may be general purpose, programmable processors, application specific integrated circuits (ASICs), programmable logic controllers (PLCs) or any other general, specific, or single use processors, including processors that have read only or read/write memories, such as EPROMs, EEPROMs, flash memory, etc. Moreover, each chipboard or chip set may be a standalone unit that may include one or more electronic sensors, processors, etc., electronically connected to one or more integrated lighting features and the integrated lighting features may be controlled locally by the logic on the chipset. In other cases, the integrated electronic system may include a network of communicating electronic devices (e.g., sensors, processors, lighting features, etc.) which may communicate with each other via an electronic bus (which may be a wired or a wireless bus, for example) that is integrated into the vehicle, such as into the vehicle body or vehicle body panels. In this case, various different sensors, processors, lighting features, and other electronic components may be disposed in different locations or in different chipsets at different locations in the vehicle (e.g., in the door panels, the body panels, the roof, etc. of the vehicle) and these components may be connected via a wired bus, such as a CAN bus or any other open protocol or proprietary protocol communications bus. The various electronic components may communicate with each other via the bus using, for example, addressed communications.

Figure 24:
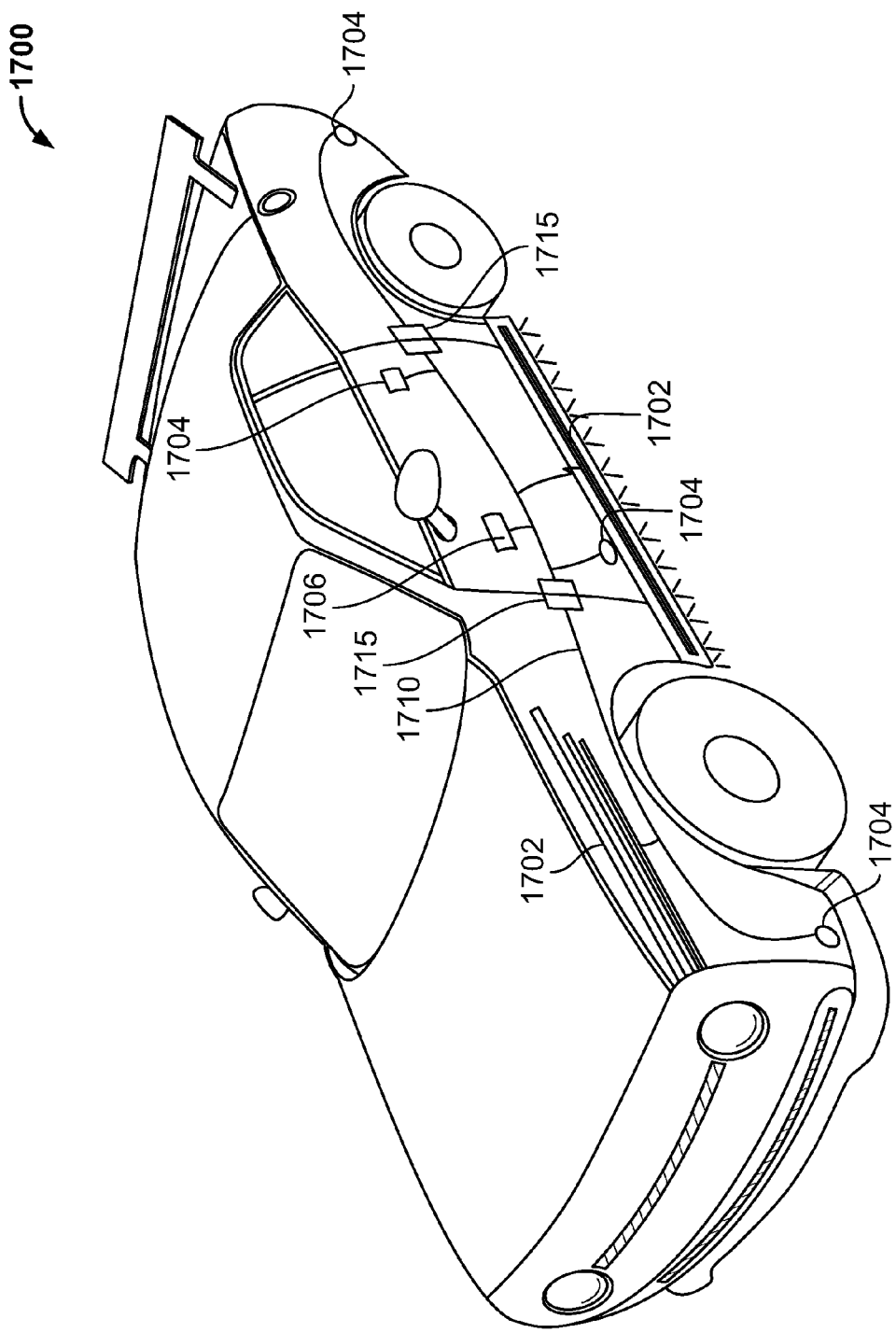
FIG. 24 illustrates an example vehicle body with various integrated electronic components that are disposed within various ones of vehicle body components and that are connected via an integrated wired bus.

As an example, FIG. 24 illustrates an example vehicle body 1700 with integrated lighting features 1702, sensors 1704, chipboards 1706 and one or more wired buses 1710 disposed within and/or integrated within the vehicle body 1700 or body components of the vehicle body 1700. In this case, the sensors 1704 may be motion, touch, light, etc.

sensors which are powered independently or which may be powered via the bus 1710, and the sensors 1704 may send signals to one or more processors (such as to a processor on the chipboard 1706) via the bus 1710. The processor may store and implement control logic that determines one or more actions to be taken based on the sensor measurements or signals. The processor on the chipboard 1706 may then generate control or activation signals (e.g., digital or analog messages or signals) that are sent over the bus 1710 to one or more of the lighting features 1702 (e.g., to turn integrated lighting features on or off) and/or to other electronic components (e.g., to electronic actuators that unlock or lock doors), etc. The lighting features 1702 and/or other electronic components may be integrated into a body panel or may be apart from or dependent from a body panel (e.g., the locking and unlocking mechanism for a door). Of course, the electronic system could be configured with point to point communications, such that the processors may send activation or control signals via dedicated communication lines integrated into one or more vehicle body panels to various components using non-bus based communications, such as analog signals. In a still further implementation, the wired communication bus 1710 may be replaced with a wireless communication network, such as a local area network implemented within the vehicle 1700 to perform communications with and between the various electronic components 1702, 1704, 1706. In such a case, each chipset or each electronic component may include a wireless interface to perform wireless communications with other components. If desired, the integrated electronic components 1702, 1704, 1706 may communicate via the same wireless network as a wireless network provided within the vehicle, such as one having a server communicatively connected to the internet, a wireless telephone system, etc. The integrated electronic components 1702, 1704, 1706 may also be connected to the vehicle engine and diagnostics communications network if so desired.

As will be understood, any or all of the electronic components, e.g., the lights 1702, the sensors 1704, the chipboards 1706, the wired bus 1710, may be integrated within the body panels of the vehicle using any of the techniques described herein. Moreover, in some cases, a processor or a chipset 1706 may activate a lighting feature 1702 or engage a sensor 1704 or other electronic device by providing a power signal to the lighting feature 1702 or sensor 1704 or electronic device, or the processor or chipboard 1706 may communicate with lighting features 1702 and other electronic components via digital signals to active these components. The bus 1710 may be limited to a particular vehicle body component or may span or extend across various different body components as illustrated in FIG. 24 in which the bus 1710 extends through the front fender panel, the driver's side door panel and the rear fender panel. Bus connectors 1715 may be located at the edge of each panel, and these connectors 1715 may be integrated into the panels so as to have a connector interface extending out of or at least at the edge of the panel, which the interface enables a separate electrical connection to be connected between the adjoining panels to thereby extend the bus 1710 across the edges of the various panels. In this manner, the bus 1710 enables processors in one panel to receive signals from and to control electronic devices 1702, 1704, 1706 located at and/or integrated into other vehicle panels. Still further, the bus 1710 may be a powered bus that provides power (e.g., DC or AC current or voltage) to one or more of the electronic components 1702, 1704, 1706 connected to the bus 1710. In this case, a power supply (which may be connected to the vehicle battery or which may be a stand-alone power supply) may be connected to the bus 1710 to provide power over the bus 1710 to power or energize the other electronic components 1702, 1704, 1706 connected to the bus 1710.

As one example, a driver-side rocker of the vehicle body 1700 may include a chipboard 1706 connected to a motion sensor 1704 and a lighting feature 1702, both of which are integrated into a carbon fiber body of the rocker as described above. The motion sensor 1704 may be positioned to detect movement, such as, for example, an object dropping from above and falling underneath the car body. The connected chipboard 1706 or the processor on the chipboard 1706 receives information or signals from the sensor 1704, and may be programmed to turn on the connected lighting features 1702 in the driver-side rocker or on the door component in response to various kinds of signals from the sensor 1704. Additionally, the chipboard 1706 may communicate the sensor information via the CAN bus 1710 or other protocol bus installed in or attached to the vehicle body 1700, to other processors or electronic components, which receive the information from the chipset 1706 and respond by taking other actions, if desired. As an example, the CAN bus 1710 may be designed to provide communications between the chipset 1706 and a chipboard integrated in the passenger-side rocker (not shown in FIG. 24). In this example, the bus 1710 can relay one or more sensor signals to both the driver-side and passenger-side chipboards, which can then turn on their respective connected lighting features to illuminate both sides of the car body. The CAN bus 1710 may thus be used to provide communications between a number of different integrated chipboards or other electronic components 1702, 1704, 1706 within the vehicle body 1700. The bus 1710 may send digital signals, power signals, or both through the wires or leads of the bus 1710. A given chipboard 1706 may receive certain commands via the bus 1710 and may execute the commands by turning on a sensor 1704, turning on a light 1702, etc. If desired, the copper wires or other wires of the bus 1710, e.g., the CAN bus, may be shielded prior to being incorporated into or integrated into a body component 1700 to protect the signals on the bus 1710 from interfering signals or frequencies, and these wires may be integrated into the carbon fiber layers or other composite layers of the vehicle panels or components in any of the manners described herein.

Moreover, the operation of the chipboards or of any of the connected electronic devices 1702, 1704, 1706 may be changed via software updates which may be provided via the bus 1710, via a wireless communication protocol communication network, or in any other manner. Still further, any type of bus or wireless protocol may be used to perform communications between electronic components, including internet protocol communications, Bluetooth communications, etc.

Further, while the vehicle components described herein have been described mainly for automobiles, similar components, shells, and/or panels can be made for other types of vehicles including bicycles, trucks, three-wheelers, snow mobiles, jet skis, airplanes, speed boats, motorcycles, hoverboards, electric scooters, and segways.

The figures and description provided herein depict and describe preferred embodiments of vehicle component shells and a design and ordering system for such vehicle components shells for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for vehicle component shells and for a system and a process for designing, manufacturing and installing vehicle component shells may be used. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of manufacturing a vehicle component, the method comprising:
   providing a mold of a vehicle component, the mold including an interior side;
   adding a first layer of composite material to the interior side of the mold, wherein the first layer includes a top side and a back side, the top side adjacent to the interior side of the mold and configured to take a shape of the interior side of the mold;
   forming a design recess in at least the first layer of composite material;
   placing an electronic component within the design recess;
   adding a second layer of composite material, wherein the second layer includes a top side and a back side, a portion of the top side adjacent to the electronic component, wherein the mold, first layer, second layer, and electronic component are arranged in a layered assembly;
   impregnating the first layer and second layer of composite material with epoxy;
   curing the layered assembly to shape the first layer of composite material to the shape of the interior side of the mold and to produce an integrated body having an integrated electronic component, an exterior surface, and an interior surface.

2. The method of claim 1, further comprising placing the layered assembly into a bag and sealing the bag, and vacuuming the layered assembly sealed in the bag before curing the layered assembly.

3. The method of claim 1, wherein impregnating the first layer and second layer of composite material includes obtaining a first layer and a second layer of pre-impregnated carbon fiber.

4. The method of claim 1, wherein impregnating the first layer and second layer of composite material includes adding epoxy to the layered assembly before curing the layered assembly.

5. The method of claim 1, further comprising connecting wiring to the electronic component adjacent to a portion of the second layer such that the wiring is disposed between the first layer and the second layer of composite material.

6. The method of claim 5, further comprising disposing the wiring connected to the electronic component through a bore formed in the second layer of composite material and a bore formed in an additional layer of composite material such that one end of the wiring is externally located from the integrated body.

7. The method of claim 1, further comprising adding a different layer of composite material to the first layer, wherein the different layer includes a top side and a back side, the top side adjacent to the back side of the first layer and wherein the layered assembly includes the different layer of composite material.

8. The method of claim 7, wherein forming the design recess includes removing a portion of the first layer of composite material in a shape of a design to form a void having an outer edge and removing a portion of the different layer of composite material in the shape of the design to form a void with an outer edge, and further aligning the void of the first layer with the void of the different layer, wherein the outer edge of the void of the first layer is adjacent to the outer edge of the void of the different layer.

9. The method of claim 7, wherein forming the design recess includes cutting the first layer of composite material and the different layer of composite material to form a void after the different layer of composite material is added to the first layer of composite material.

10. The method of claim 1, wherein forming the design recess and placing the electronic component within the design recess simultaneously includes shaping the first layer of composite material around the electronic component.

11. The method of claim 1, further comprising placing a spacer within the design recess and around the electronic component to permit the electronic component to be removable from the layered assembly after the curing step, the spacer configured to isolate the electronic component from the first layer and second layer of composite material.

12. The method of claim 1, further comprising placing a lens within the design recess, wherein an exterior edge of the lens is configured to engage an outer edge of the design recess, and wherein placing the electronic component within the design recess includes placing a lighting material between the lens and the second layer of composite material, the lighting material configured to illuminate when powered.

13. The method of claim 1, wherein placing the electronic component within the design recess includes placing a light emitting diode (LED) within the design recess.

14. The method of claim 1, wherein placing the electronic component within the design recess includes placing a fiber optical lighting component within the design recess.

15. The method of claim 1, wherein curing the layered assembly includes forming a clear and smooth layer of epoxy between the interior side of the mold and the top surface of the first layer of composite material.

16. The method of claim 1, wherein placing the electronic component within the design recess includes placing a sensor within the design recess.

17. The method of claim 1, wherein placing the electronic component within the design recess includes placing a chipboard within the design recess.

18. The method of claim 1, wherein forming the design recess includes extending the design recess through the first layer of composite material.

* * * * *